US012701562B2

(12) United States Patent
Liu et al.

(10) Patent No.: US 12,701,562 B2
(45) Date of Patent: Aug. 4, 2026

(54) METHODS AND APPARATUSES FOR SPATIAL RESOURCE SELECTION

(71) Applicant: Telefonaktiebolaget LM Ericsson (publ), Stockholm (SE)

(72) Inventors: Yusheng Liu, Lund (SE); Mats Åhlander, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 18/274,265

(22) PCT Filed: Dec. 1, 2021

(86) PCT No.: PCT/EP2021/083762
§ 371 (c)(1),
(2) Date: Jul. 26, 2023

(87) PCT Pub. No.: WO2022/161664
PCT Pub. Date: Aug. 4, 2022

(65) Prior Publication Data
US 2024/0089944 A1 Mar. 14, 2024

Related U.S. Application Data

(60) Provisional application No. 63/143,099, filed on Jan. 29, 2021.

(51) Int. Cl.
H04W 72/044 (2023.01)
H04W 72/542 (2023.01)
(52) U.S. Cl.
CPC ....... H04W 72/046 (2013.01); H04W 72/542 (2023.01)
(58) Field of Classification Search
CPC .......................... H04W 72/046; H04W 72/542
See application file for complete search history.

(56) References Cited

U.S. PATENT DOCUMENTS 10,439,702 B2 10/2019 Skov et al.
2013/0005272 A1* 1/2013 Shah .................... H04B 1/7113
455/67.11
(Continued)

FOREIGN PATENT DOCUMENTS

JP 2012129811 A 7/2012
WO WO-2020056180 A1 * 3/2020 ........... H04L 5/0051
WO 2021185461 A1 9/2021

OTHER PUBLICATIONS

Ericsson , "Maintenance of Rel. 16 UL reference signals for NR positioning", 3GPP TSG-RAN WG1 Meeting #100e, R1-2001003, e-Meeting, Feb. 24-Mar. 6, 1-5.

(Continued)

Primary Examiner — Mewale A Ambaye
(74) Attorney, Agent, or Firm — Murphy, Bilak & Homiller, PLLC

(57) ABSTRACT

A method is disclosed for spatial resource selection from a plurality of spatial resources. The method comprises, for each of least one spatial resource of the plurality of spatial resources, determining, for each of multiple time instances, a quality state for the spatial resource, based on reference signals received on the spatial resource, and filtering the quality states, to determine a filtered quality state value for the spatial resource. The method further comprises determining whether the spatial resource is to be considered for spatial resource selection based on the filtered quality state value. The spatial resources may be beams of a beamforming application, or antennas of a multi-antenna arrangement, or multiple-input multiple-output (MIMO) streams, for example. The reference signals may comprise one or more of uplink reference signals, sounding reference signals, demodulation reference signals, and phase tracking reference signals. Corresponding apparatus, network node (e.g., (Continued)

400

410
DETERMINE QUALITY STATES FOR SPATIAL RESOURCE

420
FILTER QUALITY STATES

430
DETERMINE WHETHER SPATIAL RESOURCE TO BE CONSIDERED FOR SELECTION base station), and computer program product are also disclosed.

20 Claims, 9 Drawing Sheets

(56) References Cited

U.S. PATENT DOCUMENTS

| | | | |
|---|---|---|---|
| 2013/0321207 A1* | 12/2013 | Monogioudis | H01Q 3/40 |
| | | | 342/373 |
| 2017/0311321 A1* | 10/2017 | Kakishima | H04B 7/0456 |
| 2018/0270717 A1 | 9/2018 | Kakishima et al. | |
| 2019/0109679 A1 | 4/2019 | Liu et al. | |
| 2020/0059896 A1 | 2/2020 | Xu et al. | |
| 2020/0112872 A1 | 4/2020 | Nimbavikar et al. | |
| 2020/0366430 A1* | 11/2020 | Yu | H04B 7/0814 |
| 2021/0266981 A1 | 8/2021 | Wei et al. | |
| 2021/0329596 A1 | 10/2021 | Freda et al. | |
| 2022/0256642 A1* | 8/2022 | Luo | H04W 76/28 |
| 2023/0232464 A1 | 7/2023 | Agiwal et al. | |
| 2024/0089944 A1 | 3/2024 | Liu et al. | |
| 2024/0098536 A1* | 3/2024 | Sharma | H04W 56/001 |

OTHER PUBLICATIONS

Huawei , et al., "UL SRS design for beam management and CSI acquisition", 3GPP TSG RAN WG1 Meeting #90bis, R1-1717307, Prague Czech Republic, Oct. 9-13, 2017, 1-13.
Samsung , et al., "WF on Beam Correspondence", 3GPP TSG RAN WG1 Meeting #87, R1-1613542 (R1-1613682) , Agenda item 7.1.3.3, Reno, USA, Nov. 14-18, 2016, 1-5.
VIVO , "Discussion on beam management for NR MIMO", 3GPP TSG RAN WG1 AH_NR Meeting, R1-1700274, Spokane, USA, Jan. 16-20, 2017, 1-7.

* cited by examiner

400

| 410 |
| DETERMINE QUALITY STATES FOR SPATIAL RESOURCE |

| 420 |
| FILTER QUALITY STATES |

| 430 |
| DETERMINE WHETHER SPATIAL RESOURCE TO BE CONSIDERED FOR SELECTION |

440

| 441 |
| Configure reception node(s) |

| 442 |
| Receive RS:s |

| 443 |
| Determine whether quality criterion is met |

| 444 |
| Determine whether to consider for selection |

| 445 |
| Select spatial resource to be used by transmitter |

| 446 |
| Transmit accordingly |

METHODS AND APPARATUSES FOR SPATIAL RESOURCE SELECTION

TECHNICAL FIELD

The present disclosure relates generally to the field of wireless communication. More particularly, it relates to selection of spatial resources for wireless communication.

BACKGROUND

When a wireless communication system utilizes the same, or overlapping, frequency ranges for communication in a first link direction (e.g., uplink, UL) and for communication in a second link direction (e.g., downlink, DL), channel conditions estimated based on reference signals communicated in the first link direction may be used to approximate channel conditions for communication in the second link direction. The approximate channel conditions for communication may then be used for spatial resource selection for transmission in the second link direction.

As used herein, the term spatial resource may refer to any spatial resource for a multi-antenna system, e.g., one or more of: a transmission beam, a reception beam, an antenna or antenna element, a multiple-input multiple-output (MIMO) layer or stream, etc., and refers to a resource that may be used, alone or in combination with other spatial resources, to define a direction for signal transmission and/or reception or to define a spatial separation of a signal's transmission and/or reception from other signals.

In some scenarios, the accuracy of the channel condition estimation may be less than desired or required. For example, when reference signals used for estimating channel conditions are transmitted in different frequency intervals— within the frequency range of the first link direction—at different time intervals (e.g., due to frequency hopping of the reference signals), the channel condition estimation becomes more cumbersome and the spatial resource selection may consequently become less accurate. For example, an unsuitable spatial resource may be selected and/or a suitable spatial resource may be improperly discarded from selection. For example, when the channel condition estimation becomes more cumbersome, the accuracy of the channel condition estimation may be less than desired or required, thereby causing the spatial resource selection to be less accurate. Therefore, there is a need for improved approaches to spatial resource selection in such scenarios.

More generally, improved methods for spatial resource selection are needed.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

In various (e.g., some of the) embodiments described in detail below, this is done by filtering instantaneous discontinuous transmission (DTX) states, so as to reliably find the beams that contain sounding reference signals (SRS) with sufficiently good quality for subsequent beamforming processing or, more generally, to identify and select spatial resources suitable for beamforming.

Example embodiments of the disclosed techniques, apparatuses, and systems include a method for spatial resource selection from a plurality of spatial resources, such as might be carried out by a network node, such as a base station. This example method comprises, for each of at least one spatial resource of the plurality of spatial resources, determining, for each of a plurality of time instances, a quality state for the spatial resource, based on reference signals received on the spatial resource, and filtering the quality states, to determine a filtered quality state value for the spatial resource. The method further comprises, for the at least one spatial resource, determining whether the spatial resource is to be considered for spatial resource selection based on the filtered quality state value.

A first aspect is a method for spatial resource selection from a plurality of spatial resources. The method comprises—for each of at least one spatial resource of the plurality of spatial resources—determining, for each of a plurality of time instances, a quality state for the spatial resource, based on reference signals received on the spatial resource, filtering the quality states, to determine a filtered quality state value for the spatial resource, and determining whether the spatial resource is to be considered for spatial resource selection based on the filtered quality state value.

In some embodiments, the quality state belongs to a collection of possible quality states comprising a first quality state and a second quality state.

In some embodiments, the first quality state indicates better quality than the second quality state.

In some embodiments, the first and second quality states are a non-DTX state and a DTX state, respectively.

In some embodiments, the quality state is either the first quality state or the second quality state.

In some embodiments, each quality state is determined by comparing a reference signal quality for the respective time instance to a reference signal quality threshold, to obtain either the first quality state or the second quality state.

In some embodiments, the non-DTX states correspond to reference signal qualities higher than the reference signal quality threshold.

In some embodiments, filtering the quality states comprises using a first filter function when a most recent quality state is the first quality state and using a second filter function when the most recent quality state is the second quality state, the first and second filter functions being different.

In some embodiments, an influence of the most recent quality state on a filter output is higher for the first filter function than for the second filter function.

In some embodiments, the second filter function is implemented using an infinite impulse response (IIR) filter, or a finite impulse response (FIR) filter.

In some embodiments, the first filter function output equals the most recent quality state.

In some embodiments, the first and second quality states correspond to first and second numerical values, respectively, and filtering the quality states comprises calculating a usability metric as a function of the numerical value for a most recent quality state and a previous value for the filtered quality state value, to obtain the filtered quality state value.

In some embodiments, the function is asymmetric with respect to the function's response to the first and second numerical values.

In some embodiments, the first numerical value is zero and an effect of the function comprises, when the most recent quality state corresponds to the first numerical value: dividing the previous value for the filtered quality state value by a first filter parameter having a value greater than one.

In some embodiments, an effect of the function comprises, when the most recent quality state corresponds to the second numerical value: adding the previous value for the filtered quality state value, multiplied by a second filter parameter having a value between zero and one, to the value for the most recent quality state value, multiplied by a third filter parameter having a value between zero and one.

In some embodiments, the function takes the form of:

$$DTX_b^{filtered} = \begin{cases} (1 - \alpha) * DTX_b^{filtered,prev} + \alpha * DTX_b, & DTX_b = 1 \\ DTX_b^{filtered,prev} \big/ K, & DTX_b = 0 \end{cases},$$

where $$DTX_b^{filtered}$$

is the filtered quality state value, $DTX_b$ is the most recent quality state, 0 and 1 are the first and second numerical values, $$DTX_b^{filtered,prev}$$

is the previous value for the filtered quality state value, a is a filter parameter having a value between 0 and 1, K is a filter parameter having a value greater than 1, and b is an index to the spatial resource.

In some embodiments, the function is symmetric with respect to the function's response to the first and second numerical values.

In some embodiments, the function takes the form of:

$$DTX_b^{filtered} = (1 - \alpha) * DTX_b^{filtered,prev} + \alpha * DTX_b, DTX_b = -1, 1,$$

where $$DTX_b^{filtered}$$

is the filtered quality state value, $DTX_b$ is the most recent quality state, −1 and 1 are the first and second numerical values, $$DTX_b^{filtered,prev}$$

is the previous value for the filtered quality state value, a is a filter parameter having a value between 0 and 1, and b is an index to the spatial resource.

In some embodiments, determining whether the spatial resource is to be considered for spatial resource selection comprises comparing the filtered quality state value to a quality state threshold.

In some embodiments, determining whether the spatial resource is to be considered for spatial resource selection comprises, for a first spatial resource, evaluating the filtered quality state value for the first spatial resource jointly with a filtered quality state value for a second spatial resource.

In some embodiments, the first spatial resource is a first beam having a beam direction and a first antenna polarization and the second spatial resource is a second beam having the same beam direction as the first beam and a second antenna polarization, the second antenna polarization differing from the first antenna polarization.

In some embodiments, the method comprises, for a first spatial resource being a beam of a first node, filtering quality states corresponding to each of a plurality of antenna ports for a second node, to obtain filtered quality state values for each of the plurality of antenna ports, and determining whether the first spatial resource is to be considered for spatial resource selection based on the filtered quality state values for the plurality of antenna ports.

In some embodiments, determining whether the first spatial resource is to be considered for spatial resource selection comprises determining that the first spatial resource is to be considered for spatial resource selection if at least one of the filtered quality state values for the plurality of antenna ports fulfills a predetermined threshold requirement.

In some embodiments, the method comprises, for a first spatial resource being an antenna port of a first node, filtering quality states corresponding to each of a plurality of beams for a second node, to obtain filtered quality state values for each of the beams, and determining whether the first spatial resource is to be considered for spatial resource selection based on the filtered quality state values for the plurality of beams.

In some embodiments, the first aspect may be applied in the context of a method that comprises—for each spatial resource of the plurality of spatial resources—receiving a plurality of reference signal blocks using the spatial resource (wherein at least some of the reference signal blocks are received in different frequency intervals and during different time intervals), determining (for each received reference signal block) whether or not a signal quality metric of the received reference signal block meets a quality criterion, and determining whether the spatial resource is to be considered for spatial resource selection based on the quality criterion determinations of the received reference signal blocks.

In some embodiments, a selected spatial resource is to be used by a transmitter.

In some embodiments, determining whether the spatial resource is to be considered for spatial resource selection comprises determining that the spatial resource is to be considered for spatial resource selection when the quality criterion is met for the most recently received reference signal block.

In some embodiments, determining whether the spatial resource is to be considered for spatial resource selection comprises determining that the spatial resource is to be considered for spatial resource selection when the quality criterion is met for at least a first number of the plurality of received reference signal blocks.

In some embodiments, determining whether the spatial resource is to be considered for spatial resource selection comprises determining that the spatial resource is not to be considered for spatial resource selection when the quality criterion is not met for the most recently received reference signal block.

In some embodiments, determining whether the spatial resource is to be considered for spatial resource selection comprises determining that the spatial resource is not to be considered for spatial resource selection when the quality criterion is not met for at least a second number of the plurality of received reference signal blocks.

In some embodiments, determining whether the spatial resource is to be considered for spatial resource selection is further based on whether the plurality of reference signal blocks are received in a same time slot.

In some embodiments, determining whether the spatial resource is to be considered for spatial resource selection is further based on whether the quality criterion is met for at least one of a group of most recently received reference signal blocks of at least one spatial resource of the plurality of spatial resources.

In some embodiments, determining whether the spatial resource is to be considered for spatial resource selection comprises letting the quality criterion determination of a first received reference signal block have more impact than the quality criterion determination of a second received reference signal block when the first received reference signal block is more recently received than the second received reference signal block.

In some embodiments, the determination of whether the spatial resource is to be considered for spatial resource selection is applied to the different frequency intervals in which the plurality of reference signal blocks are received.

In some embodiments, the determination of whether the spatial resource is to be considered for spatial resource selection is applied to one or more frequency intervals in which none of the plurality of reference signal blocks are received.

In some embodiments, the spatial resources are beams of a beam-forming application, or antennas of a multi-antenna arrangement, or multiple-input multiple-output (MIMO) streams.

In some embodiments, the reference signal blocks comprises one or more of: uplink reference signals, sounding reference signals, demodulation reference signals, and phase tracking reference signals.

In some embodiments, the method further comprises selecting a spatial resource based on spatial resources which have been determined to be considered for spatial resource selection.

In some embodiments, selecting a spatial resource comprises selecting one of the spatial resources which have been determined to be considered for spatial resource selection, and/or selecting a spatial resource which is a combination of two or more of the spatial resources which have been determined to be considered for spatial resource selection.

A second aspect is an apparatus.

In some embodiments, the apparatus is adapted to carry out the method according to the first aspect.

In some embodiments, the apparatus is a base station apparatus. The base station apparatus comprises radio circuitry configured to communicate with one or more wireless devices and processing circuitry operatively coupled to the radio circuitry and configured to control the radio circuitry. The processing circuitry is also configured to determine, for each of a plurality of time instances, a quality state for the spatial resource, based on reference signals received on the spatial resource, filter the quality states, to determine a filtered quality state value for the spatial resource, and determine whether the spatial resource is to be considered for spatial resource selection based on the filtered quality state value.

In some embodiments, the processing circuitry is configured to carry out the method according to the first aspect.

In some embodiments, the apparatus is an apparatus for spatial resource selection from a plurality of spatial resources. The apparatus comprises controlling circuitry configured to cause—for each of at least one spatial resource of the plurality of spatial resources—determination, for each of a plurality of time instances, of a quality state for the spatial resource, based on reference signals received on the spatial resource, filtering of the quality states, to determine a filtered quality state value for the spatial resource, and determination of whether the spatial resource is to be considered for spatial resource selection based on the filtered quality state value.

In some embodiments, the second aspect may be applied in the context of an apparatus that comprises controlling circuitry configured to cause—for each spatial resource of the plurality of spatial resources—reception of a plurality of reference signal blocks using the spatial resource (wherein reception of at least some of the reference signal blocks are in different frequency intervals and during different time intervals), determination (for each received reference signal block) of whether or not a signal quality metric of the received reference signal block meets a quality criterion, and determination of whether the spatial resource is to be considered for spatial resource selection based on the quality criterion determinations of the received reference signal blocks.

A third aspect is a base station for spatial resource selection.

In some embodiments, the base station comprises processing circuitry configured to perform the method according to the first aspect.

In some embodiments, the base station comprises the apparatus of the second aspect.

In some embodiments, the base station further comprises power supply circuitry configured to supply power to the base station.

In some embodiments of the first, second, or third aspect, one or more parameters of the filtering are tunable.

A fourth aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

In some embodiments, any of the above aspects may additionally have features identical with or corresponding to any of the various features as explained above for any of the other aspects.

An advantage of some embodiments is that alternative approaches to spatial resource selection are provided.

An advantage of some embodiments is that improved approaches (e.g., compared to other approaches) to spatial resource selection are provided. Improvement may, for example, be in terms of one or more of: throughput, capacity, power efficiency, interference, beam selection accuracy, etc.

An advantage of some embodiments is that approaches are provided to spatial resource selection in scenarios where reference signals are transmitted in different frequency intervals at different time intervals.

An advantage of some embodiments is that reliable detection of valid beams is provided.

An advantage of some embodiments is that throughput is improved in non-light-of-sight (NLoS) scenarios compared to other approaches.

An advantage of some embodiments is that they facilitate reliable detection of valid beams, including in non-light-of-sight (NLoS) scenarios, where the disclosed techniques may provide improved throughput (e.g., compared to other approaches).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

Figure 1A:
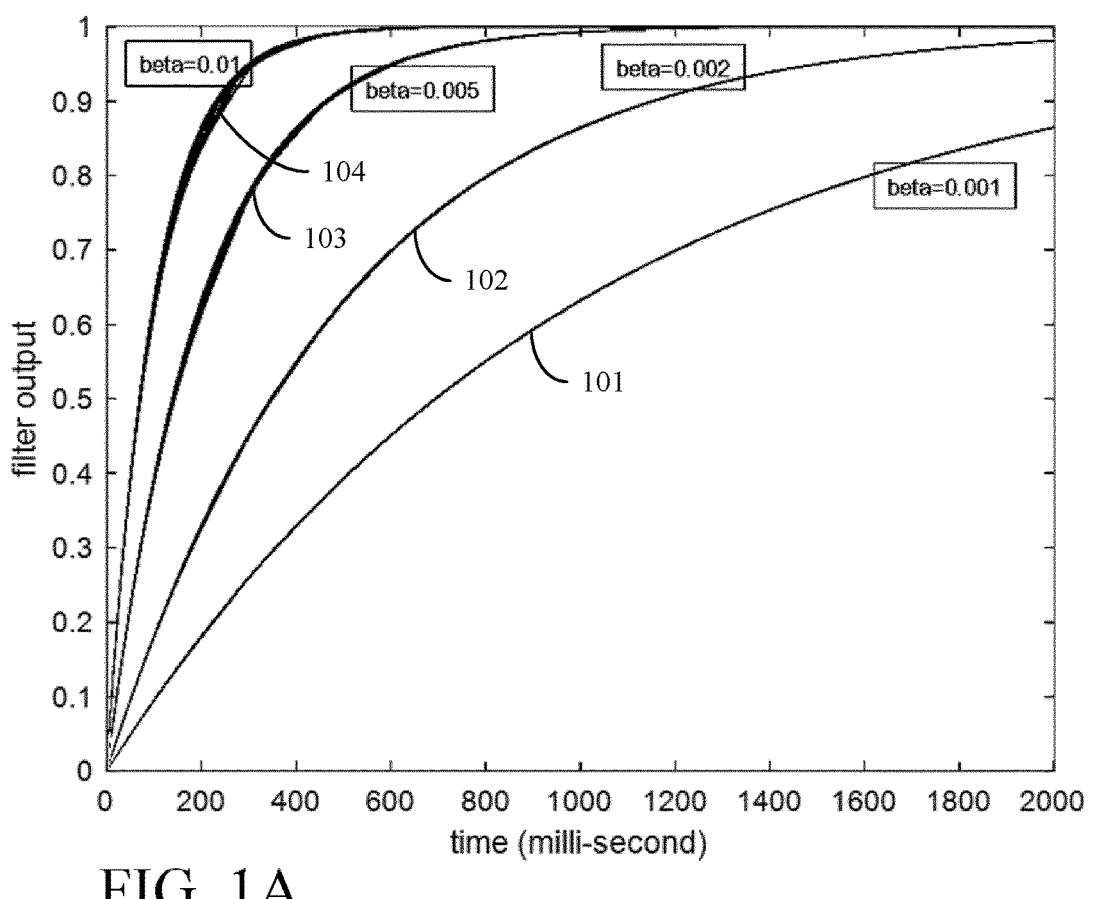
FIG. 1A illustrates (in the form of a plot) the output of an example filter according to some embodiments (e.g., according to some of the embodiments described herein)

As already mentioned above, the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, the terms signal-to-interference-and-noise ratio (SINR), signal-to-interference ratio (SIR), and signal-to-noise ratio (SNR) are used interchangeably herein, and any such reference is meant to be equally applicable for any of the terms, as well as for any other suitable signal quality metric.

Also generally, SINR will be used as example of signal quality. This is not intended as limiting. Contrarily, any signal quality metric may be used, such as signal strength, received signal strength indicator (RSSI), reference signal received power (RSRP), reference signal received quality (RSRQ), amount of energy detected, etc.

In the following, various approaches for spatial resource selection will be described. According to some embodiments, methods for sounding reference signal (SRS) discontinuous transmission (DTX) state filtering are provided. For example, instantaneous DTX states may be filtered (e.g., per beam and/or per antenna port) to reliably find out which beams contain SRS with sufficiently good quality for subsequent beamforming processing.

Generally, when filtering is referred to herein, it is meant to encompass any operation that determines an output value from two or more input values, wherein the input values relate to the same parameter; the value of which has been captured at different times to provide the input values.

Example filtering include infinite impulse response (IIR) filtering and finite impulse response (FIR) filtering. It should be noted that operations such as—for example—averaging, weighted averaging, and sliding window approaches fall under the concept of filtering.

Any suitable filter parameters (e.g., length, memory, forgetting factor, number of taps, coefficient values, etc.) and any suitable filter types may be used for implementation of various embodiments.

Some embodiments described in the following are embodiments where approaches are provided for spatial resource selection in scenarios where a wireless communication system utilizes the same, or overlapping, frequency ranges for communication in a first link direction (e.g., uplink, UL) and for communication in a second link direction (e.g., downlink, DL) and where channel conditions estimated based on reference signals communicated in the first link direction are used to approximate channel conditions for communication in the second link direction, which are in turn used for spatial resource selection for transmission in the second link direction.

For example, in a time division duplex (TDD) network, the same frequency is typically used for uplink and downlink communication and the radio channel may be assumed to be reciprocal. Thus, knowledge obtained of the radio channel in the uplink (e.g., by estimating the radio channel based on uplink reference signals) can be used to determine spatial resources for downlink transmissions; and vice versa.

Particularly, some embodiments focus on spatial resource selection for scenarios where reference signals are transmitted in different frequency intervals at different time intervals (e.g., due to frequency hopping of the reference signals).

Some examples are presented herein for transmission beam selection based on channel estimation of reference signal reception using a corresponding reception beam. It should be noted, however, that embodiments may be equally applicable to other spatial resource selection scenarios.

An advanced antenna system (AAS) may significantly improve network performance (e.g., throughput, coverage, capacity, etc.) by utilizing beamforming and MIMO techniques.

Generally, the term spatial resource may refer to any spatial resource for such systems, e.g., one or more of: a transmission beam, a reception beam, an antenna or antenna element, an antenna port, a polarization, a multiple-input multiple-output (MIMO) stream, or similar.

For example, channel estimation can be performed directly based on signals received on all antennas, or after spatial beam transformation from antenna space to beam space (e.g., to transform signals received on all antennas to signals of beam directions), and procedures described herein for beam space may be equally applicable for antenna space, and vice versa.

To illustrate scenarios where some embodiments (e.g., some embodiments of the techniques to be described below) are applicable, a particular example scenario related to discontinuous transmission (DTX) state handling in relation to reciprocity-based beamforming for downlink transmissions based on uplink sounding reference signal (SRS) reception in a TDD system will now be described.

When the radio channel is poor (e.g., has relatively low signal-to-interference-and-noise ratio (SINR); for example, SINR below a threshold value), the noise and interference factors may dominate the channel estimation achieved based on SRS reception. Downlink transmission beamforming based on such channel estimation will typically not be adequate (e.g., may not direct transmission beams in a suitable way to convey transmitted information to the users) and may negatively impact performance.

A DTX detection technique may be used to determine usefulness (e.g., reliability) of SRS channel estimates, or, more generally, of channel estimates based on other types of reference signals. This approach may be beneficial in the scenario described above, for example.

When an SRS channel estimate is determined to be useful, it may be labeled as non-DTX, and when a SRS channel estimate is determined to be not useful, it may be labeled as DTX. For example, an SRS channel estimate may be determined to be useful when a SINR value of the corresponding SRS reception falls above a threshold value, and an SRS channel estimate may be determined to be not useful otherwise.

Note that the designation of the channel estimate as "non-DTX" or "DTX" is simply a labeling, to differentiate between two quality states for the channel estimate. The channel estimate may be categorized into one of more than two quality states and/or the labels for those quality states may be different. In the present disclosure, the terms "DTX state" and "non-DTX state" are used as an example. Another possible example is "low SINR" and "high SINR".

Some embodiments (as exemplified later herein) relate to filtering of the labeling as DTX or non-DTX.

In relation to beam selection, a DTX state may be determined per beam for each SRS reception, and a beam may be set to invalid (i.e., not to be considered for beam selection) when DTX is detected, and to valid when non-DTX is detected. In some embodiments, a beam may be set to invalid by setting channel estimates (e.g., for all subcarriers) of the beam to zero. Thereby, there will be no energy on the invalid beam when beamforming weights are calculated.

Some embodiments (as exemplified later herein) relate to filtering of the labeling as DTX or non-DTX and using the filter output to indicate a filtered label (DTX or non-DTX) suitable to determine whether a beam is valid or invalid.

When SRS frequency hopping is enabled, there may typically be multiple DTX state determinations for each beam; each of which associates with a corresponding SRS hop reception. Thereby, the determination of a beam as invalid or valid may be ambiguous. One way to handle this ambiguity is to use each SRS hop to determine beam validity only for frequencies (e.g., defined by resource blocks, RB:s) covered by SRS hop. However, such an approach may lead to that outdated channel estimates are used for downlink beam selection (e.g., if inter-slot frequency hopping is configured for SRS), and/or that beams with good enough quality are unnecessarily set to invalid.

Some embodiments address the ambiguity by determining beam validity not only based on the DTX state of current SRS hop in a symbol, but also based on the DTX state of SRS hops from other symbols. In various embodiments, determining beam validity is—alternatively, or additionally—based on one or more of: hopping type (inter-slot or intra-slot), age of DTX states, and DTX states of other beams. Data transmission scheduling may also take the per hop beam validity into account. Some embodiments (as exemplified later herein, wherein the labeling as DTX or non-DTX is filtered and the filter output is used to determine whether a beam is valid or invalid, may be useful also in these situations.

Although beam validation based on DTX states can provide performance gain in line-of-sight (LoS) scenarios, where there exist one or more dominant directions, it has been found (i.e., the inventors have identified a problem) that in some non-line-of-sight (NLoS) environments there may be a performance loss.

This is (at least partly and/or in at least some scenarios) because the received energy of SRS is spread in many directions/beams. At low SINR it is more likely to detect DTX on these beams so that they are removed from further processing. A possible consequence of this is that too few valid beams, or even no valid beams, are left at low SINR; and thus the performance degradation (i.e., thus the performance degrades). These reasons for the performance loss have been identified by the inventors.

A solution is to adjust the DTX detection threshold (e.g., the threshold used to determine usefulness of the SRS channel estimate by comparing the SINR value of the corresponding SRS reception to a threshold value) so that a beam can still be determined valid even at low SINR. However, the drawback with such threshold adjustment is that the DTX detection will (generally) be less reliable. For example, beams mostly containing noise may be determined as valid, which may (in turn) cause performance loss. Hence, application of such a solution to attempt to improve performance may be inadequate, which has been identified by the inventors.

Some embodiments address the problem of performance loss more adequately. The inventors have identified that it may be desirable to introduce inertia regarding the determination of whether a beam is valid or invalid. For example, when a beam has previously (e.g., in the near past) shown characteristics (e.g., non-DTX) that caused it to be determined as valid, it may be beneficial to still consider it as valid even if it currently shows characteristics (e.g., DTX) that—according to other approaches—would cause it to be determined as invalid. Embodiments achieve this by applying filtering (e.g., filtering of the labeling as DTX or non-DTX and using the filter output to determine whether a beam is valid or invalid).

In some embodiments, the inertia is asymmetrically applied depending on a current situation for the beam under consideration. For example, currently shown beam characteristics that imply validity may be associated with lower inertia than currently shown beam characteristics that imply invalidity.

In various (e.g., some of the) embodiments described in detail below, this problem (the problem providing as good performance as possible) is addressed by filtering instantaneous DTX states used to identify usable beams or other spatial resources, so as to reliably find the beams that contain SRS with sufficiently good quality for subsequent beamforming processing or, more generally, to identify and select spatial resources suitable for beamforming.

It is worth noting that the strong directions/beams of a received signal tend to change relatively slowly, under many circumstances. Thus, the general viability of a beam is typically a relatively long-term characteristic that typically doesn't change over a period of a few seconds, or even for a much longer period. However, the measured SINR of a signal received on a specific beam can typically fluctuate rapidly below or above the DTX determination threshold in milliseconds, caused by fast fading, for example.

DTX is typically an instantaneous state that is determined upon each SRS reception (or upon each reception of some other reference signal). In the techniques (e.g., of some embodiments) described herein, a filter is used to process the instantaneous states (e.g., the instantaneous DTX/non-DTX labels) and estimate the long-term SRS usefulness; or the long-term usefulness of a beam or other spatial resource corresponding to the SRS or other reference signal.

In some embodiments of the presently disclosed techniques, a filter is designed in a way to quickly respond to non-DTX detection, to validate a useful beam. In the event that DTX is detected, this may be because the signal on that beam is only temporarily suffering a fading dip, or because the beam actually lacks usefulness long-term. So, according to some embodiments, the DTX states corresponding to a series of reference signal quality measurements are filtered, e.g., by a first order infinite impulse response (IIR) filter, to smooth the DTX decision and avoid useful beams being removed.

Generally, numerical values may be assigned to represent a quality state (e.g., DTX/non-DTX). The numerical values may be suitable as inputs to the filter. Such numerical values may have any suitable form (e.g., zero and one, zero and any non-zero value, minus one and plus one, minus/plus any non-zero value, a first non-zero value and a scaled version of the non-zero value, etc.). An output of the filter may typically also be a numerical value (e.g., a numerical value representing a quality state, or a numerical value that can be quantized to represent a quality state).

The following describes a typical approach according to some embodiments wherein a filter is designed to quickly respond to non-DTX detection.

In this approach, $DTX_b=0$ denotes that non-DTX is detected on beam b, and $DTX_b=1$ denotes that DTX is detected on beam b.

Below is the formula of an example DTX filter, according to some embodiments:

$$DTX_b^{filtered} = \begin{cases} (1-\alpha)*DTX_b^{filtered,prev} + \alpha*DTX_b, & DTX_b = 1 \\ DTX_b^{filtered,prev}/K, & DTX_b = 0 \end{cases}.$$

This formula may be used for approaches wherein a filter is designed to quickly respond to non-DTX detection.

The formula above may be seen as an example of using a first filter function (lower expression) when a most recent quality state is the first quality state (non-DTX) and using a second filter function (upper expression) when the most recent quality state is the second quality state (DTX).

In this expression, $DTX_b$ is the input value according to detected instantaneous DTX state of the current SRS reception, $$DTX_b^{filtered}$$

is the filter output, and $$DTX_b^{filtered,prev}$$

is a previous filter output, e.g., as calculated from the previous SRS reception.

The parameter $\alpha$ is the filter coefficient, or forgetting factor, which may be calculated using $\Delta t$, the time difference between current and previous SRS reception. In a real network, $\Delta t$ is typically in the range from 5 milliseconds to several hundred milliseconds. The parameter $\alpha$ may, for example, be calculated according to $\alpha=1-(1-\beta)^{\Delta t}$, where $\beta$ is a design parameter (typically having a value between zero and one). Any other suitable choice of a may be equally applicable. For example, any choice of $\alpha$, wherein an increased $\Delta t$ results in an increased $\alpha$ may be suitable. Typically, $\alpha$ has a value between zero and one.

FIG. 1A shows the output of the filter described above, with different $\beta$ settings. The y-axis represents the filter output, the x-axis represents time (wherein a distance between two points on the x-axis may correspond to $\Delta t$), and results for $\beta$ values ("beta" in FIG. 1A) of 0.001, 0.002, 0.005, and 0.01 are illustrated by 101, 102, 103, and 104, respectively. The illustrated filter output is for $DTX_b=1$ and $$DTX_b^{filtered,prev} = 0.$$

Thus, the plot shown in FIG. 1A may be seen as representing values of a for different values of β and Δt.

In the example filter design described above, K is a parameter to control (i.e., for controlling) how fast the filter responds to non-DTX detection. Typically, K should be greater than 1 so that (the value of) the filter output decreases upon non-DTX detection ($DTX_b$=0). For example, if K=2 and a threshold for validating the beam is configured to 0.55, a single non-DTX detection will bring the filter output below the threshold and, thus, immediately validate the beam. If it is preferred that multiple non-DTX detections are needed before the beam is validated, then either K or the threshold, or both, can be adjusted (e.g., lowering K and/or lowering the threshold value). Setting K to infinity corresponds to bypassing of the filter when $DTX_b$=0, which may be applicable according to some embodiments. The latter may be seen as an example of letting the first filter function output equal the most recent quality state.

In some embodiments, the values of one or more of the parameters α, β, and K are pre-determined and/or fixed. Alternatively, or additionally, the values of one or more of the parameters α, β, and K may be tunable and/or dynamic.

The example filter design presented above may be varied in any suitable way. For example, the filter design presented above may be used for $DTX_b$=0 while another filter design is used for $DTX_b$=1, or the filter design presented above may be used for $DTX_b$=1 while another filter design is used for $DTX_b$=0. Alternatively, or additionally, an order of the IIR filter may be varied to be larger than one.

In some embodiments, a machine learning algorithm is applied to find a suitable filter design for $DTX_b$=0 and/or to find suitable values of one or more of the parameters α, β, and K.

Typically, a threshold is assigned a value which is at a suitable level (e.g., halfway, or close to halfway) between the numerical values assigned to represent the quality state.

In various embodiments, the value of the threshold(s) may be pre-determined and/or fixed and/or tunable and/or dynamic. In some embodiments, a machine learning algorithm is applied to find suitable threshold value(s).

Figure 1B:
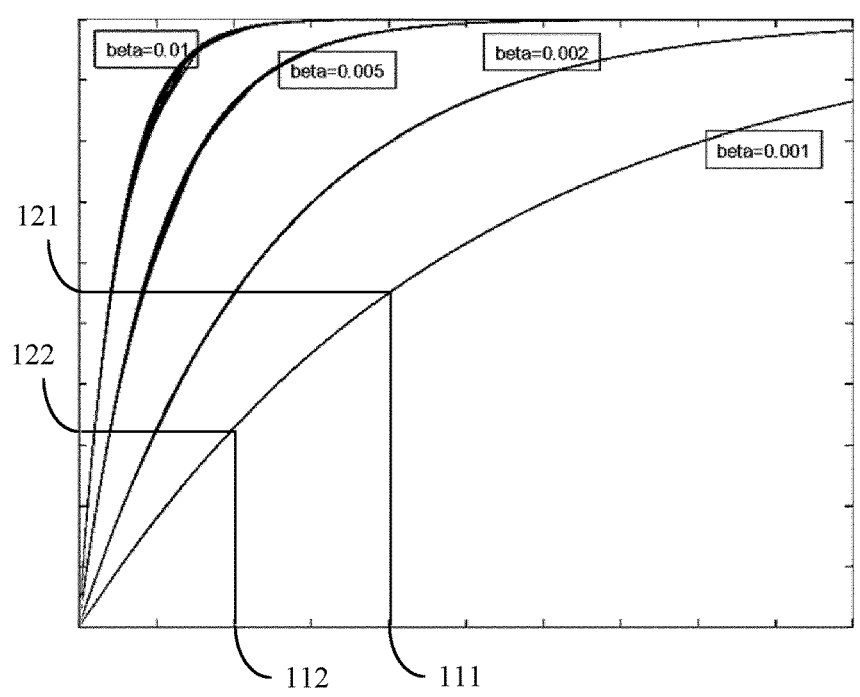
FIG. 1B is a plot illustrating example values of a filter coefficient according to some embodiments, as well as example threshold values according to some embodiments.

FIG. 1B shows a slightly simplified version of the plot presented in FIG. 1A; illustrating example values of the filter coefficient α according to some embodiments. In FIG. 1B an example approach for setting threshold values is also illustrated, which may be applicable according to some embodiments. In this approach, a threshold value is set based on β and Δt when Δt is represented relative to the origin (i.e., relative to a time equal to 0); using the above function for α. More specifically, the threshold value is set to the value of $\alpha=1-(1-\beta)^{\Delta t}$. Assuming that β=000.1 and Δt has the value indicated by 111, the threshold value is set to the value indicated at 121, assuming that β=000.1 and Δt has the value indicated by 112, the threshold value is set to the value indicated at 122, etc.

Other ways to implement filters designed to quickly respond to non-DTX detection (e.g., asymmetric filter designs) are possible, as well as implementations of filters designed to respond equally fast to non-DTX detection as to DTX detection (e.g., symmetric filter designs).

The determination/detection of the quality state DTX/non-DTX may be implemented using a DTX detector. The DTX detector may, for example, be a SINR detector. A misdetection rate of the DTX detector may be estimated (e.g., by running simulations).

While the asymmetric filter designs (e.g., the filter design illustrated above) typically prioritize non-DTX detection and aim to quickly respond to (indications of) valid beams, this (type of) filter typically works best with a DTX detector design that has a relatively (e.g., very) low misdetection rate. If the DTX detector is (instead) designed for (e.g., to tolerate) a high misdetection rate, the non-DTX decision becomes less reliable.

In such a scenario, the filter design may then take into account the DTX detector tolerance (e.g., regarding the misdetection rate). For example, the filter may still apply an asymmetric design and use one or more of the parameters K, β and α and/or the threshold value(s) to adjust the performance (e.g., the parameter and/or threshold value(s) may be set based on an estimated misdetection rate). Alternatively, the filter may instead be implemented symmetrically. For example, a symmetric filter may be used to smooth the input instantaneous DTX states (e.g., using the below formula).

The following describes a typical approach according to some embodiments wherein a filter is designed to respond equally fast to non-DTX detection as to DTX detection.

In this approach, $DTX_b$=1 denotes that non-DTX is detected on beam b, and $DTX_b$=−1 denotes that DTX is detected on beam b.

Below is one example formula according to this approach:

$$DTX_b^{filtered} = (1 - \alpha) * DTX_b^{filtered,prev} + \alpha * DTX_b, DTX_b = -1, 1$$

In this expression, $DTX_b$ is the input value according to detected instantaneous DTX state of the current SRS reception, $$DTX_b^{filtered}$$

is the filter output, and $$DTX_b^{filtered,prev}$$

is a previous filter output, e.g., as calculated from the previous SRS reception.

The parameter α is the filter coefficient, or forgetting factor, which may have the same features as described above for the asymmetric example, or other features.

In a similar manner as for the asymmetric filter design, a threshold may be used to determine whether the beam is valid or invalid based on the filter output (e.g., by comparing the filter output value to the threshold value).

Other filter designs may be used in other embodiments, where "filtering" should typically be understood generally as the processing of a series of values, in this case a time series of values corresponding to reference signal quality states. Examples can be simply windowing and/or averaging the instantaneous DTX states to smoothen the decision-making metric before threshold comparison operations described in below embodiments.

Whatever the filter design, the filter output may be compared with a threshold to determine usefulness (e.g., status as valid or invalid) of a beam or other spatial resource.

A beam can be considered useful (e.g., valid), for example, if the filter output is below the threshold (assuming that non-DTX is represented by a lower numerical value than DTX, i.e., assuming that DTX, which typically represents a relatively poor reference signal state, is assigned a higher numerical value than non-DTX, which typically represents a relatively better reference signal state).

The opposite (that non-DTX is represented by a higher numerical value than DTX) may be true in some implementations, in which case a valid or useful beam may be determined by assessing whether the filter output is above a threshold (i.e., a beam can be considered useful (e.g., valid), for example, if the filter output is above the threshold).

In any case, the threshold can be chosen, for example, as the filter output (e.g., for a certain time Δt) when $$DTX_b^{filtered, prev} = 0,$$

as exemplified by FIG. 1B. This time period (i.e., the certain time Δt) used for threshold selection may be denoted as T. The choice of T means that a beam is determined as not useful (e.g., invalid) if all SRS receptions under (e.g., during) the time T are detected DTX after setting the filter output to the value representing non-DTX (zero in the case of FIG. 1B). Thus, in some embodiments, this time period for threshold selection is denoted as T, which means a beam is determined not useful if all SRS reception under time T are detected DTX after setting filter output=0.

It should be noted that beam validity may, according to some embodiments, be jointly determined by processing filter outputs corresponding to multiple beams and/or ports.

In some embodiments, beam validity is not determined jointly and is based only on threshold comparison of its own filter output (e.g., if the filter output is below a threshold, the beam is reliably detected as non-DTX and it is used as a valid beam for subsequent beamforming processing).

In other embodiments, the usefulness (validity) of a beam can be jointly determined based on (e.g. by processing) filter output of a group of beams. For example, two (or more) beams with different antenna polarizations but pointing to the same direction can both be determined valid if only one of the beams (or some other predetermined fraction of the beams) fulfill the threshold requirement.

In some embodiments, a node, such as an NR gNB, can receive SRS signal from multiple (i.e., more than one) UE antenna ports. The usefulness (validity) of a beam may be jointly determined based on (e.g., by processing) filter output of multiple UE antenna ports. For example, if one of the antenna ports (or some other predetermined fraction of the antenna ports) fulfills the threshold requirement, the beam for all ports of that UE may be determined valid (i.e., the beam may be determined valid for all ports of that UE).

In some embodiments, the DTX filter output from multiple beams can be used to jointly determine UE antenna port validity. For example, if no beam (or some other predetermined fraction of considered beams) fulfill a threshold requirement for an antenna port, that port may be removed from consideration for all beams.

Additionally, or alternatively, multiple thresholds can be used to categorize the filter output. For example, two thresholds may be defined, one for beam level usefulness, $Thres_1$ or Threshold_1, and one for port level usefulness $Thres_2$ or Threshold_2.

For example, the threshold value indicated by 121 in FIG. 1B may be used as Threshold_1 and the threshold value indicated by 122 in FIG. 1B may be used as Threshold_2.

The following is a typical example of how multiple thresholds may be used. In the example, it is assumed that non-DTX is represented by a lower numerical value than DTX.

When the filter output of several/all beams for a certain UE antenna port (e.g., beams with different antenna polarizations but pointing to the same direction) is above the second threshold $Thres_2$, the port can be determined (as) invalid and be removed from (consideration in) subsequent beamforming processing. Then, the first threshold $Thres_1$ may be used for joint validity determination of beams received on other ports.

Typically, $Thres_2$ can be smaller than $Thres_1$ (at least when non-DTX is represented by a lower numerical value than DTX). A motivation for this is that, if all beams for a port continuously detect DTX, it is more likely that the port in general has low signal quality and it is not necessary to wait that long time to make this decision (i.e., it is not necessary to wait during a larger amount of SRS receptions until the filter output falls above the first threshold to make the decision to remove the port from consideration).

Figures 2, 3:
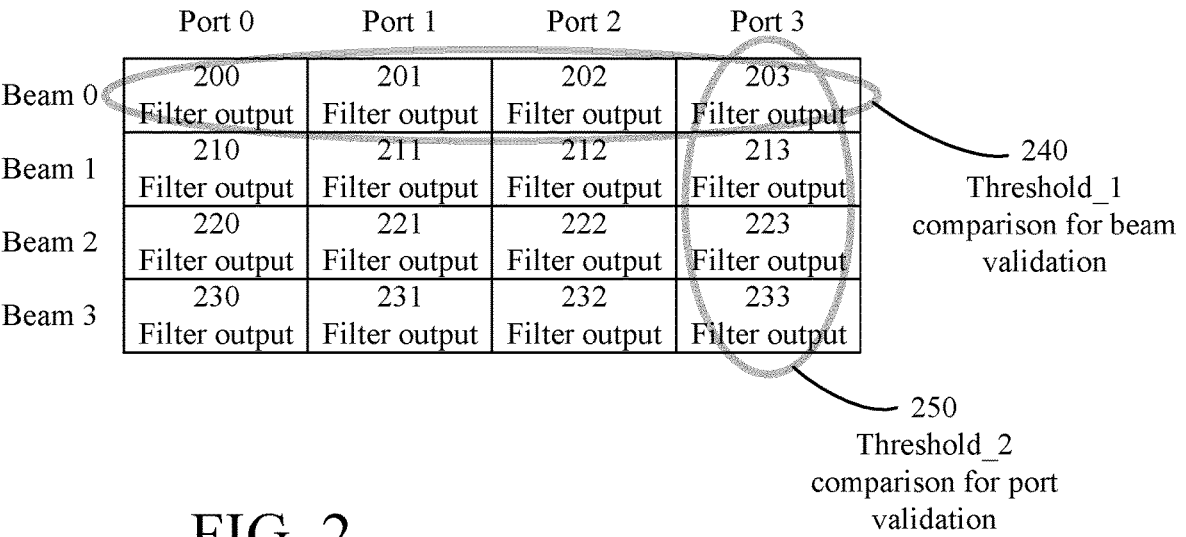
FIG. 2 illustrates an example of validating a beam, based on multiple ports (according to some embodiments), and validating a port, based on multiple beams (according to some embodiments)
FIG. 3 illustrates (an example of) the use of multiple thresholds in evaluating quality states (according to some embodiments)

The filter output categorization according to some embodiments is illustrated in FIG. 2 and FIG. 3. More specifically, FIGS. 2 and 3 illustrate example filter output categorization and joint decision of beam/port validity with multiple decision thresholds.

In FIG. 2, filter outputs 200, 201, 202, 203, 210, 211, 212, 213, 220, 221, 222, 223, 230, 231, 232, 233 are shown for four beams (Beam 0-3) wherein the filtering of each beam is performed for four ports (Port 0-3).

Evaluation of a port is illustrated by 250 for Port 3, wherein each of the filter outputs 203, 213, 223, 233 is compared to the second threshold. When all of the filter outputs 203, 213, 223, 233 are above the second threshold, Port 3 may be removed from further consideration. In some embodiments, this is achieved by setting the filter outputs 203, 213, 223, 233 to a value that corresponds to the numerical value that represents DTX.

Evaluation of a beam is illustrated by 240 for Beam 0, wherein each of the filter outputs 200, 201, 202, 203 associated with ports that are not removed from further consideration is compared to the first threshold. When a specific amount (e.g., all) of the considered filter outputs for the beam are above the first threshold, the beam may be determined as invalid, and otherwise as valid.

Evaluation of the ports may be performed whenever (e.g., before) evaluation of the beams are performed, or may be performed more seldom.

FIG. 3 illustrates the various considerations that a filter output 300 (compare with 200, 201, 202, 203, 210, 211, 212, 213, 220, 221, 222, 223, 230, 231, 232, 233 of FIG. 2) may be subjected to. In the example of FIG. 3, it is assumed that non-DTX is represented by the numerical value zero and DTX is represented by the numerical value 1.

When the filter output 300 is below the second threshold 304, the port associated with the filter output 300 is not removed from further consideration. When the filter output 300 is above the second threshold 304, the port associated with the filter output 300 may be removed from further consideration (e.g., depending on other filter outputs—for example for other beams—associated with the port). This may be compared with 250 of FIG. 2.

When the filter output 300 (if considered for beam evaluation) is below the first threshold 305, the beam associated with the filter output 300 is determined as valid. When the filter output 300 (if considered for beam evaluation) is above the first threshold 305, the beam associated with the filter output 300 may be determined as invalid (e.g., depending on other filter outputs—for example for other ports—associated with the beam). This may be compared with 240 of FIG. 2.

This approach is illustrated in FIG. 3 by terming the filter output values below the second threshold 304 as "useful" (port not removed from consideration and beam determined as valid), terming the filter output values above the first threshold 305 as "not useful" (port may be removed from consideration and, if not removed, beam may be determined as invalid), and terming the filter output values between the second threshold 304 and the first threshold 305 as "conditional" (port may be removed from consideration but, if not removed, beam is determined as valid).

The mechanisms exemplified by FIGS. 2 and 3 may, alternatively, or additionally, be used to control a switch beamforming approach; between beamforming based on reciprocity channel estimation (as assumed for the embodiments herein) and beamforming based in codebook. For example, when more than a specified number of ports are removed from consideration, a switch to beamforming based in codebook may be performed. Alternatively, or additionally, when less than a specified number of beams are determined as valid, a switch to beamforming based in codebook may be performed.

Thus, various embodiments of the presently disclosed techniques employ signal quality measurement corresponding to one or more particular directions or otherwise corresponding to one or more spatial resources, as well as energy detection or other reference signal quality measurement to determine the presence or absence of energy in that direction or for that spatial resource. Decision metrics from these instantaneous measurements are filtered, to provide for improved reliability of the determination of whether that direction or spatial resource is useful, for beam forming. Those directions, beams, or other spatial resources deemed useful, according to these filtered decision metrics are selected for further consideration or use in beamforming, spatial multiplexing, or the like.

Figure 4A:
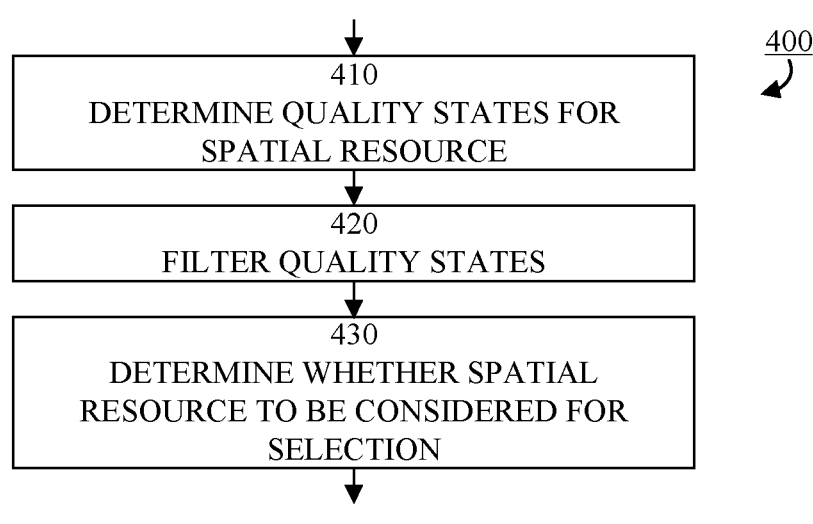
FIG. 4A is a process flow diagram (a.k.a. a flowchart) illustrating example method steps (e.g., by illustrating an example method), according to some embodiments.

In view of the detailed examples provided above, it should be appreciated that FIG. 4A illustrates an example method 400 according to some embodiments, where example method 400 represents a generalized technique consistent with the detailed examples given above. The example method 400 may be for a transmitter node and/or a network node. The example method 400 may, in some embodiments, be performed, or performable, by a radio access node, a base station, or a control node of a communication network, for example. Generally, the term base station is meant to refer to either, or both, of a radio unit (RU) and a distributed unit (DU); e.g., in the context of open radio access network (O-RAN).

The method 400 is for spatial resource selection from a plurality of spatial resources. The method 400 is particularly applicable in reciprocity scenarios. The spatial resources may, for example, be beams of a beam-forming application, or antennas or antenna ports of a multi-antenna arrangement, or multiple-input multiple-output (MIMO) streams.

The steps shown in FIG. 4A may be performed for each of at least one spatial resource of the plurality of spatial resources (e.g., for each spatial resource of the plurality of spatial resources).

As shown at block 410, method 400 includes the step of determining, for each of a plurality of time instances, a quality state for the spatial resource, based on reference signals received on the spatial resource. The term "quality state" typically refers to a discrete category, condition, or other state determined from the reference signal or signals. As discussed above, the quality state may be a DTX state or non-DTX state, for example, and may be represented by these or other labels or by numerical values.

The quality state may belong to a collection of possible quality states comprising a first quality state (e.g., non-DTX) and a second quality state (e.g., DTX), wherein the first quality state may indicate better quality than the second quality state. It should be noted that, even if a collection of two quality states is used as an example herein (i.e., the quality state is either the first quality state or the second quality state), some embodiments may employ more than two quality states.

The quality state may be determined based on the reference signals in any suitable way. For example, a SINR for the received reference signals may be compared to a threshold value to determine the quality state. Each quality state may correspond to a respective numerical value.

Generally, it should be noted that the threshold for determining the quality state is a different threshold than the threshold(s) for determining whether the spatial resource is to be considered for spatial resource selection.

As shown at block 420, the method 400 further comprises the step of filtering the quality states, to determine a filtered quality state value for the spatial resource. By filtering is meant that a series of quality states is processed to determine a filtered quality state corresponding to an interval of time longer than that associated with a single reference signal instance, according to some embodiments. Filtering may be implemented using any suitable filter, or combination of filters as mentioned above.

For example, filtering the quality states may comprise filtering the numerical values representing the determined quality states. In some embodiments, step 420 may comprise calculating a usability metric as a function of the numerical value for a most recent quality state and a previous value for the filtered quality state value, to obtain the filtered quality state value.

Finally, as shown at block 430, method 400 comprises the step of determining whether the spatial resource is to be considered for spatial resource selection based on the filtered quality state value.

For example, step 430 may comprise comparing the filtered quality state value to one or more thresholds (e.g., as exemplified above) to determine whether the spatial resource is to be considered for spatial resource selection (e.g., whether it is valid or invalid).

In various embodiments, each quality state is determined in step 410 by comparing a reference signal quality (e.g., SINR) for the respective time instance to a reference signal quality threshold, to obtain either a first quality state or a second quality state. As described above, the received reference signal block may be labeled as non-DTX when the quality criterion (i.e., the quality criterion of determining the quality state, such as the reference signal quality threshold) is met and as DTX otherwise, according to some embodiments.

These first and second quality states may be a non-DTX state and a DTX state, respectively, the non-DTX state corresponding to reference signal qualities higher than the reference signal quality threshold. Thus, for example, the quality state may be determined based on whether or not a signal quality metric (e.g., SINR) of the received reference signal or signals meets a quality criterion (e.g., falls above a threshold value). As described above, the received reference signal block may be labeled as non-DTX when the quality criterion is met and as DTX otherwise, according to some embodiments.

In various embodiments, the filtering of the quality states in step 420 comprises using a first filter function when a most recent quality state is the first quality state and using a second filter function when the most recent quality state is the second quality state, the first and second filter functions being different. Thereby, the filter may be configured to respond differently (e.g., which different speed) depending on whether the most recent quality state is the first or second quality state.

This may be particularly useful, for approaches wherein a filter should respond more quickly to non-DTX detection than to DTX detection. For example, the filtering may comprise letting an influence (or impact) of the most recent quality state on a filter output be higher for the first filter function than for the second filter function. Alternatively, or additionally, the first filter function may have a higher forgetting factor than the second filter function.

As already mentioned, the quality states may be represented by numerical values, for example. Thus, in various embodiments the first and second quality states correspond to first and second numerical values, respectively, and filtering the quality states comprises calculated the usability metric as a function of the numerical value for a most recent quality state and a previous value for the filtered quality state value, to obtain the filtered quality state value.

In some of these embodiments, this function is asymmetric with respect to the function's response to the first and second numerical values.

For example, the first numerical value may be zero and an effect of the function when the most recent quality state corresponds to the first numerical value may be that of dividing the previous value for the filtered quality state value by a first filter parameter having a value greater than one. Alternatively, or additionally, an effect of the function when the most recent quality state corresponds to the second numerical value may be that of adding the previous value for the filtered quality state value, multiplied by a second filter parameter having a value between zero and one, to the value for the most recent quality state value, multiplied by a third filter parameter having a value between zero and one.

In an example, the function takes the form of:

$$DTX_b^{filtered} = \begin{cases} (1-\alpha) * DTX_b^{filtered,prev} + \alpha * DTX_b, & DTX_b = 1 \\ DTX_b^{filtered,prev} / K, & DTX_b = 0 \end{cases},$$

where $$DTX_b^{filtered}$$

is the filtered quality state value, $DTX_b$ is the most recent quality state, 0 and 1 are the first and second numerical values, $$DTX_b^{filtered,prev}$$

is the previous value for the filtered quality state value, a is a filter parameter having a value between 0 and 1, K is a filter parameter having a value greater than 1, and b is an index to the spatial resource.

In other embodiments, the function may be symmetric with respect to the function's response to the first and second numerical values. In an example, the function takes the form of:

$$DTX_b^{filtered} = (1-\alpha) * DTX_b^{filtered,prev} + \alpha * DTX_b, \quad DTX_b = -1, 1,$$

where $$DTX_b^{filtered}$$

is the filtered quality state value, $DTX_b$ is the most recent quality state, $-1$ and 1 are the first and second numerical values, $$DTX_b^{filtered,prev}$$

is the previous value for the filtered quality state value, a is a filter parameter having a value between 0 and 1, and b is an index to the spatial resource.

In some embodiments, the step of determining in step 430 of whether the spatial resource is to be considered for spatial resource selection comprises comparing the filtered quality state value to a quality state threshold.

In some embodiments, determining whether the spatial resource is to be considered for spatial resource selection comprises, for a first spatial resource, evaluating the filtered quality state value for the first spatial resource jointly with a filtered quality state value for a second spatial resource. In some of these embodiments, for example, the first spatial resource may be a first beam having a beam direction and a first antenna polarization while the second spatial resource is a second beam having the same beam direction (as the first beam) and a second antenna polarization, the second antenna polarization differing from the first antenna polarization.

In some embodiments, the method comprises, for a first spatial resource being a beam of a first node, filtering quality states corresponding to each of a plurality of antenna ports for a second node, to obtain filtered quality state values for each of the plurality of antenna ports, and determining whether the first spatial resource is to be considered for spatial resource selection based on the filtered quality state values for the plurality of antenna ports (compare with examples of FIGS. 2 and 3). In some of these embodiments, determining whether the first spatial resource is to be considered for spatial resource selection comprises determining that the first spatial resource is to be considered for spatial resource selection if at least one of the filtered quality state values for the plurality of antenna ports fulfills a threshold requirement. The threshold requirement may be predetermined, or may be dynamically variable.

In some embodiments, the method may comprise, for a first spatial resource being an antenna port of a first node, filtering quality states corresponding to each of a plurality of beams for a second node, to obtain filtered quality state values for each of the beams, and determining whether the first spatial resource is to be considered for spatial resource selection based on the filtered quality state values for the plurality of beams (compare with examples of FIGS. 2 and 3).

Generally, the reference signals used to determine the quality states for the spatial resources may be any suitable reference signaling. For example, the reference signals may comprise one or more of: uplink reference signals, sounding reference signals (SRS:s), demodulation reference signals (DMRS:s), and phase tracking reference signals.

Also generally, at least some of the reference signals may be received in different frequency intervals and during different time intervals (e.g., due to frequency hopping). The reference signals may further be received in a same slot (intra-slot hopping) or in two or more different slots (inter-slot hopping), according to some embodiments.

Step 430 of FIG. 4A, i.e., determining whether the spatial resource is to be considered for spatial resource selection based on the filtered quality state value, may involve marking the spatial resource as valid or invalid, according to some embodiments. Valid spatial resources may then be used for spatial resource selection according to any suitable approach, while invalid spatial resources may be excluded from spatial resource selection (e.g., by setting corresponding channel estimates to zero).

Considering a spatial resource for selection may generally comprise one or more of: actually selecting that spatial resource, having that spatial resource as a candidate for selection, and selecting a spatial resource which is a combination of that spatial resource and other spatial resources, any of which may be embodied in a selection step. Thus, in some embodiments the method shown in FIG. 4A may be followed by the step of selecting one or more spatial resources determined as valid (i.e., to be considered). The selected spatial resource may be for use by the transmitter for a subsequent transmission to a reception node or nodes.

In some applications, beams (spatial resources) processed according to the steps shown in FIG. 4A are not used directly as transmission beams. Instead, the selection of one or more of these beams as a spatial resource may comprise calculation of a precoder for transmission (selected spatial resource) based on the channel estimates of the valid/considerable beams.

It should be noted that selection of a spatial resource (whether it is a spatial resource processed in the steps of FIG. 4A or a combination of such spatial resources) may be used for other purposes than transmission. Other examples include using the selected spatial resource(s) for reception equalization and/or scheduling of transmissions for outgoing or incoming traffic.

The determination in step 430 of whether the spatial resource is to be considered for spatial resource selection may be implemented in various ways. For example, step 430 may comprise determining whether the spatial resource is to be considered for spatial resource selection based on more than one filtered quality state value corresponding to the spatial resource.

Alternatively, or additionally, step 430 may comprise determining whether the spatial resource is to be considered for spatial resource selection based on one or more filtered quality state values associated with other spatial resources.

Figure 4B:
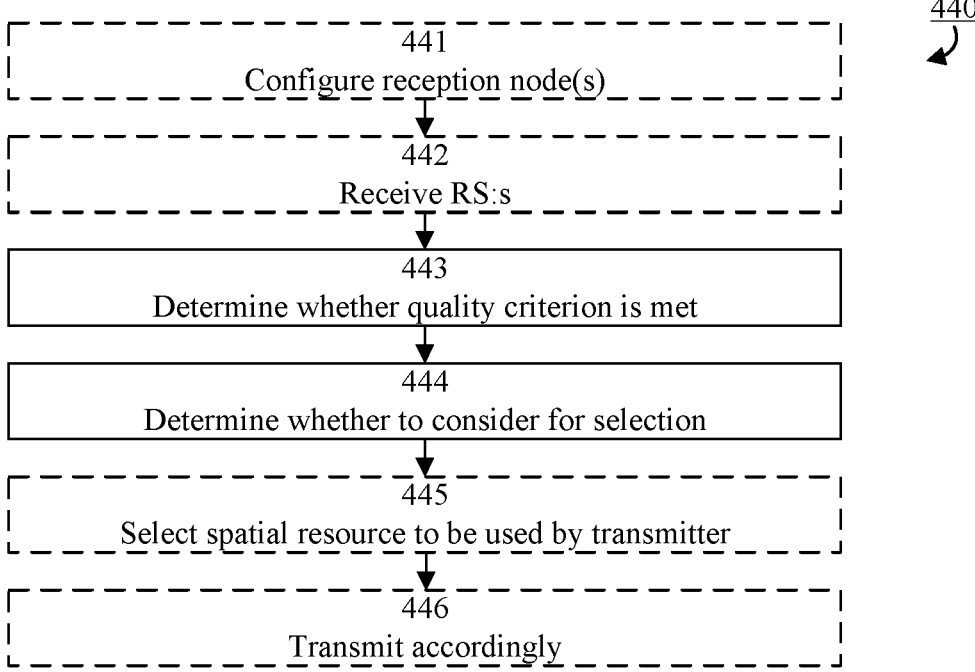
FIG. 4B is a flowchart illustrating example method steps according to some embodiments.
Figure 4C:
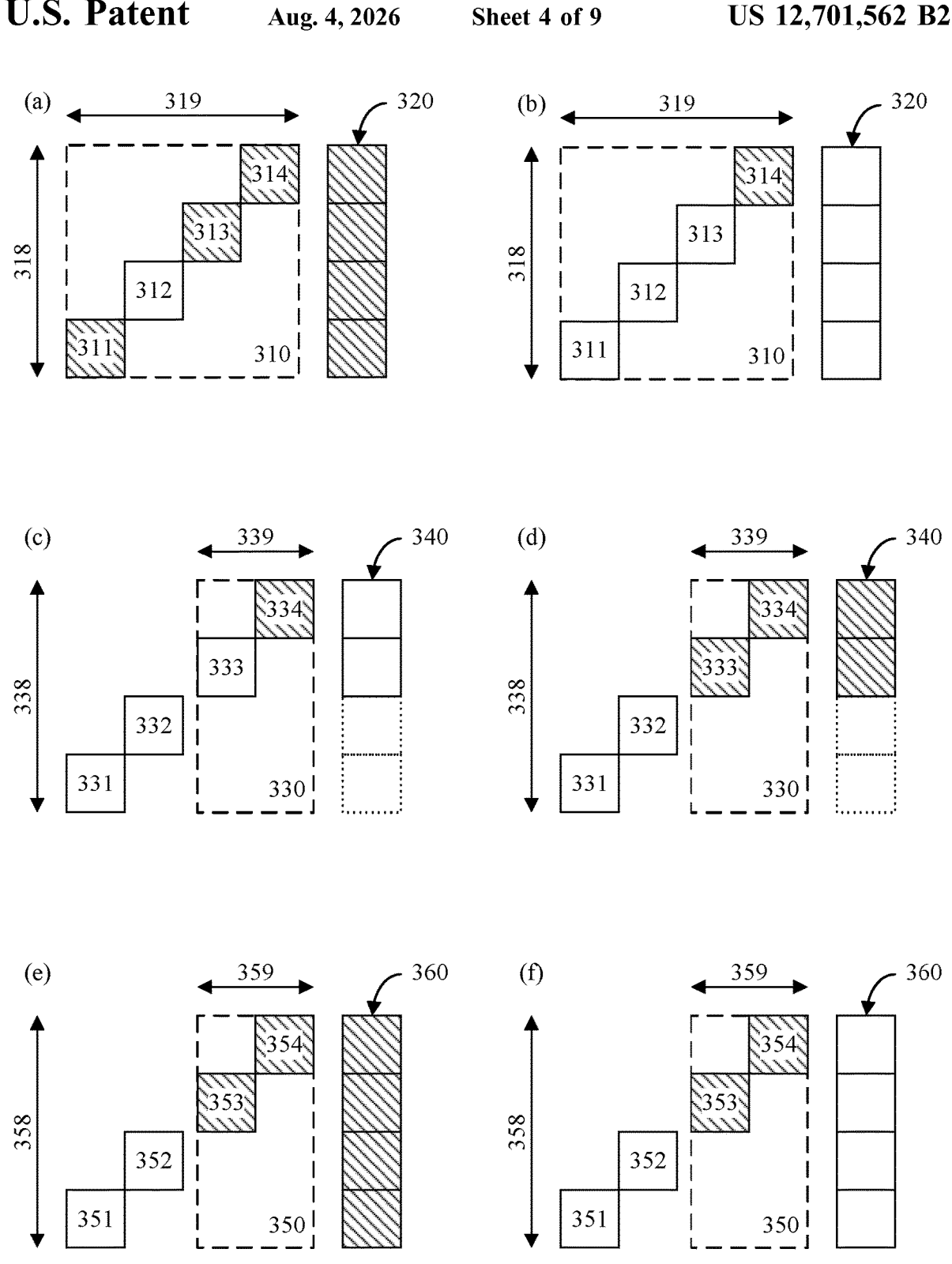
FIG. 4C is a schematic drawing illustrating various spatial resource categorizations according to some embodiments.
Figure 4D:
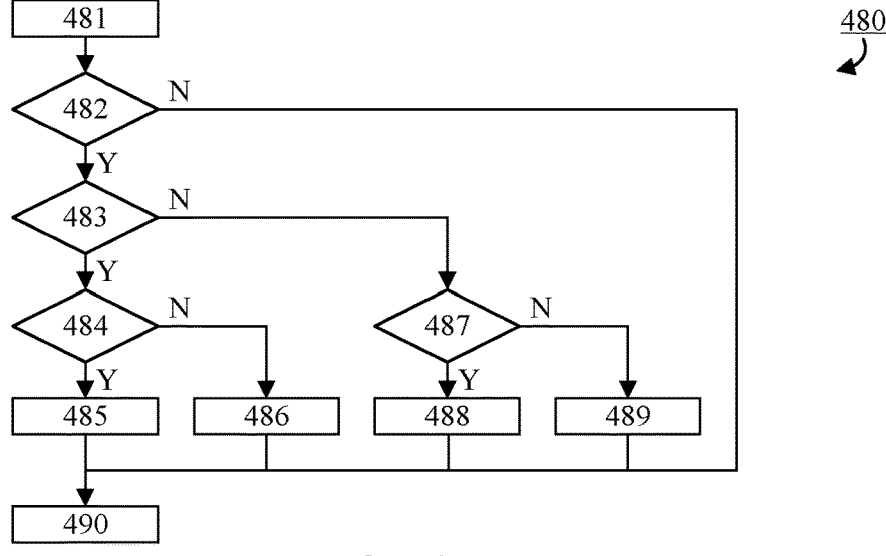
FIG. 4D is a flowchart illustrating example method steps according to some embodiments.

Some embodiments (e.g., the method of FIG. 4A) may be applicable in scenarios for spatial resource selection from a plurality of spatial resources as will be exemplified in connection with FIGS. 4B-D. FIG. 4B illustrates an example method 440 according to some embodiments. The example method 440 may be for a transmitter node and/or a network node. The example method 440 may, in some embodiments, be performed, or performable, by a radio access node, a base station, or a control node of a communication network.

The method 440 is for spatial resource selection from a plurality of spatial resources. The method 440 is particularly applicable in reciprocity scenarios.

The spatial resources may, for example, be beams of a beam-forming application, or antennas of a multi-antenna arrangement, or multiple-input multiple-output (MIMO) streams.

In optional step 441, one or more reception nodes (e.g., user equipments, UE:s) may be configured to transmit reference signals for use in the spatial resource selection. The configuration may be in accordance with any suitable approach. For example, the configuration may involve transmission of a configuration signal to the reception node(s). The configuration may, for example, specify one or more of: whether or not to apply frequency hopping, a frequency hopping pattern (in time and/or frequency domain), whether to apply inter-slot or intra-slot hopping, etc.

Steps 442, 443 and 444 may be performed for each spatial resource of the plurality of spatial resources.

In step 442, a plurality of reference signal blocks (RS:s) are received using the spatial resource. For example, when the spatial resource selection concerns transmission beam selection, the reference signal blocks may be received using a corresponding reception beam. The plurality of reference signal blocks may comprise two, three, four, or more reference signal blocks.

Generally, the reference signal blocks may be any suitable reference signaling. For example, the reference signal blocks may comprise one or more of: uplink reference signals, sounding reference signals (SRS:s), demodulation reference signals (DMRS:s), and phase tracking reference signals.

Also generally, at least some of the reference signal blocks are received in different frequency intervals and during different time intervals (e.g., due to frequency hopping). The reference signal blocks may further be received in a same slot (intra-slot hopping) or in two or more different slots (inter-slot hopping), according to some embodiments.

In step 443, it is determined—for each received reference signal block—whether or not a signal quality metric (e.g., SINR) of the received reference signal block meets a quality criterion (e.g., falls above a threshold value). As described above, the received reference signal block may be labeled as non-DTX when the quality criterion is met and as DTX otherwise, according to some embodiments.

In step 444, it is determined whether the spatial resource is to be considered for spatial resource selection based on the quality criterion determinations of the received reference signal blocks.

Step 444 may involve marking the spatial resource as valid or invalid, according to some embodiments. Valid spatial resources may then be used for spatial resource selection according to any suitable approach, while invalid spatial resources may be excluded from spatial resource selection (e.g., by setting corresponding channel estimates to zero).

In some embodiments, the method 400 of FIG. 4A may be performed in steps 443 and 444 of the method 440. Then, determining whether or not a signal quality metric of the received reference signal block meets a quality criterion and determining whether the spatial resource is to be considered for spatial resource selection based on the quality criterion determinations of the received reference signal blocks may comprise determining the quality state(s) based on signal quality metric(s) (e.g., SINR) as described in connection with step 410 of FIG. 4A, filtering the quality state(s) as described in connection with step 420 of FIG. 4A, and determining whether the spatial resource is to be considered for spatial resource selection based on the filtered quality state value as described in connection with step 430 of FIG. 4A. For example, the quality criterion may correspond to the threshold to which the filtered quality state value is compared in some embodiments.

Considering a spatial resource for selection may generally comprise one or more of: actually selecting that spatial resource, having that spatial resource as a candidate for selection, and selecting a spatial resource which is a combination of that spatial resource and other spatial resources, any of which may be embodied in a selection step as illustrated by optional step 445.

In optional step 445, a spatial resource is selected based on the spatial resources determined as valid (i.e., to be considered) in step 444. The selected spatial resource may be for use by the transmitter for transmission to the reception node(s).

In optional step 446, the selected spatial resource is used for transmission.

In some typical applications, the beams (spatial resources) processed in steps 442-444 are not used directly as transmission beams. Instead, the selection of step 445 comprises calculation of a precoder for transmission (selected spatial resource) based on the channel estimates of the valid/considerable beams.

It should be noted that selection of a spatial resource (whether it is a spatial resource processed in steps 442-444, or a combination of such spatial resources) may be used for other purposes than transmission. Other examples include using the selected spatial resource(s) for reception equalization and/or scheduling of transmissions for outgoing or incoming traffic.

The determination in step 444 of whether the spatial resource is to be considered for spatial resource selection may be implemented in various ways.

For example, step 444 may comprise determining whether the spatial resource is to be considered for spatial resource selection based on more than one of the quality criterion determinations of the received reference signal blocks.

Alternatively, or additionally, step 444 may comprise determining whether the spatial resource is to be considered for spatial resource selection based on one or more quality criterion determinations associated with received reference signal blocks other than the most recently received reference signal block and/or associated with received reference signal blocks other than a group of most recently received reference signal blocks (e.g., reference signal blocks received in a current slot).

Yet alternatively, or additionally, step 444 may comprise determining whether the spatial resource is to be considered for spatial resource selection in one frequency interval based on one or more quality criterion determinations associated with received reference signal blocks received in other frequency intervals.

In some embodiments, step 444 may comprise determining that the spatial resource is to be considered for spatial resource selection when the quality criterion is met for the most recently received reference signal block.

In some embodiments, step 444 may comprise determining that the spatial resource is not to be considered for spatial resource selection when the quality criterion is not met for the most recently received reference signal block.

In some embodiments, step 444 may comprise determining that the spatial resource is to be considered for spatial resource selection when the quality criterion is met for at least one of a group of most recently received reference signal blocks (e.g., reference signal blocks received in a current slot).

In some embodiments, step 444 may comprise determining that the spatial resource is not to be considered for spatial resource selection when the quality criterion is not met for at least one of a group of most recently received reference signal blocks (e.g., reference signal blocks received in a current slot).

In some embodiments, step 444 may comprise determining that the spatial resource is to be considered for spatial resource selection when the quality criterion is met for at least a first number (e.g., one, two, half, all, or any other suitable threshold value) of the plurality of received reference signal blocks, or of a group of most recently received reference signal blocks (e.g., reference signal blocks received in a current slot).

In some embodiments, step 444 may comprise determining that the spatial resource is not to be considered for spatial resource selection when the quality criterion is not met for at least a second number (e.g., one, two, half, all, or any other suitable threshold value; which may be the same as—or differ from—the first number) of the plurality of received reference signal blocks, or of a group of most recently received reference signal blocks (e.g., reference signal blocks received in a current slot).

In some embodiments, the determination of step 444 may be further based on whether the quality criterion is met for at least one of a group of most recently received reference signal blocks (e.g., reference signal blocks received in a current slot) of at least one spatial resource of the plurality of spatial resources.

For example, when the quality criterion is met for at least one of a group of most recently received reference signal blocks (e.g., to an extent that the corresponding spatial resource will be considered for selection), a first (default) approach may be used for determining whether the spatial resource under consideration is (also) to be considered for selection, while when the quality criterion is not met for at least one of a group of most recently received reference signal blocks (e.g., such that no spatial resource will be considered for selection if the first approach was used), a second approach may be used for determining whether the spatial resource under consideration is to be considered for selection. The second approach is typically more relaxed than the first approach; allowing spatial resources to be considered more easily. The second approach may be seen as a worst case scenario approach.

Generally, determining whether the spatial resource is to be considered for spatial resource selection may be further based on whether or not the plurality of reference signal blocks are received in a same time slot (intra-slot frequency hopping or inter-slot frequency hopping).

Also generally, determining whether the spatial resource is to be considered for spatial resource selection may comprise letting the quality criterion determination of a first received reference signal block have more impact than the quality criterion determination of a second received reference signal block when the first received reference signal block is more recently received than the second received reference signal block. In such approaches, relatively old reference signal blocks may be seen as less trusted than relatively new reference signal blocks. Implementation may be achieved by applying weights in the form of scaling values during the determination of step 444.

For example, if DTX is represented by a negative value (e.g., −1) and non-DTX is represented by a positive value (e.g., 1), all values of the previous slot may be weighted by 0.5, all values of the slot before that may be weighted by 0.25, and all values of earlier slots may be weighted by 0 (i.e., discarded). Then, the weighted values may be summed and the result compared to a threshold (e.g., 0) to determine whether the spatial resource is to be considered for spatial resource selection.

In some embodiments, the determination of step 444 may further comprise applying a determination regarding consideration of a spatial resource for one frequency interval also to other frequency intervals than those in which the plurality of reference signal blocks are received. For example, such application may be to one or more frequency intervals in which none of the plurality of reference signal blocks are received. This may be particularly useful, for example, when a reception frequency range does not cover the entire transmission frequency range, and/or for inter-slot hopping.

It should be noted that any suitable combination of the above approaches relating to step 444 may also be applicable according to some embodiments.

FIG. 4C schematically illustrates some various spatial resource categorizations according to some embodiments, in a context of a reference signal frequency range 318; 338; 358 and a time duration 319; 339; 359 (e.g., defined through a number of orthogonal frequency division multiplexing— OFDM—symbols).

Parts (a) and (b) show intra-slot frequency hopping scenarios. Thus, the plurality of reference signal blocks 311, 312, 313, 314 are received in a same time slot 310. A corresponding beam validity is schematically illustrated by 320.

In the example of part (a), reference signal blocks 311, 313, and 314 have signal quality metrics that do not meet the quality criterion (illustrated by striping), while reference signal block 312 has a signal quality metric that meets the quality criterion, and the beam 320 is considered invalid (also illustrated by striping) for the entire frequency range 318.

Determining that the spatial resource 320 is not to be considered for spatial resource selection when the quality criterion is not met for the most recently received reference signal block 314 may yield the result illustrated in part (a).

Determining that the spatial resource 320 is not to be considered for spatial resource selection when the quality criterion is not met for at least one 311,313,314 of a group of most recently received reference signal blocks 311, 312, 313, 314 may yield the result illustrated in part (a).

Determining that the spatial resource 320 is not to be considered for spatial resource selection when the quality criterion is not met for at least a number (e.g., one, two/half, or three) of the plurality of received reference signal blocks, or of a group of most recently received reference signal blocks 311, 312, 313, 314 may yield the result illustrated in part (a).

In the example of part (b), reference signal block 314 has a signal quality metric that do not meet the quality criterion (illustrated by striping), while reference signal blocks 311, 312, 313 have signal quality metrics that meet the quality criterion, and the beam 320 is considered valid for the entire frequency range 318.

Determining that the spatial resource 320 is to be considered for spatial resource selection when the quality criterion is met for at least one 311, 312, 313 of a group of most recently received reference signal blocks 311, 312, 313, 314 (compare with step 488 of FIG. 4D to be described later) may yield the result illustrated in part (b).

Determining that the spatial resource 320 is to be considered for spatial resource selection when the quality criterion is met for at least a number (e.g., one, two/half, or three) of the plurality of received reference signal blocks, or of a group of most recently received reference signal blocks 311, 312, 313, 314 may yield the result illustrated in part (b).

Parts (c), (d), (e) and (f) show inter-slot frequency hopping scenarios. Thus, the plurality of reference signal blocks 331, 332, 333, 334; 351, 352, 353, 354 are not received in a same time slot 330; 350. Corresponding beam validity is schematically illustrated by 340; 360.

In the example of part (c), reference signal block 334 has a signal quality metric that do not meet the quality criterion (illustrated by striping), while reference signal blocks 331, 332, 333 have signal quality metrics that meet the quality criterion, and the beam 340 is considered valid for the frequency intervals covered by reference signals blocks received in the slot 330.

Determining that the spatial resource 340 is to be considered for spatial resource selection when the quality criterion is met for at least one 333 of a group of most recently received reference signal blocks 333, 334 (compare with step 286 of FIG. 4D to be described later) may yield the result illustrated in part (c).

In the example of part (d), reference signal blocks 333, 334 have signal quality metrics that do not meet the quality criterion (illustrated by striping), while reference signal blocks 331, 332 have signal quality metrics that meet the quality criterion, and the beam 340 is considered invalid (also illustrated by striping) for the frequency intervals covered by reference signals blocks received in the slot 330.

Determining that the spatial resource 340 is not to be considered for spatial resource selection when the quality criterion is not met for the most recently received reference signal block 334 may yield the result illustrated in part (d).

Determining that the spatial resource 340 is not to be considered for spatial resource selection when the quality criterion is not met for at least one 333, 334 of a group of most recently received reference signal blocks 333,334 may yield the result illustrated in part (d).

Determining that the spatial resource 340 is not to be considered for spatial resource selection when the quality criterion is not met for at least a number (e.g., one/half, or two) of a group of most recently received reference signal blocks 333,334 may yield the result illustrated in part (d).

In the example of part (e), reference signal blocks 353,354 have signal quality metrics that do not meet the quality criterion (illustrated by striping), while reference signal blocks 351, 352 have signal quality metrics that meet the quality criterion, and the beam 360 is considered invalid (also illustrated by striping) for the entire frequency range 358.

Determining that the spatial resource 360 is not to be considered for spatial resource selection when the quality criterion is not met for the most recently received reference signal block 354 may yield the result illustrated in part (e).

Determining that the spatial resource 360 is not to be considered for spatial resource selection when the quality criterion is not met for at least one 353, 354 of a group of most recently received reference signal blocks 353,354 may yield the result illustrated in part (e).

Determining that the spatial resource 360 is not to be considered for spatial resource selection when the quality criterion is not met for at least a number (e.g., one/half, or two) of a group of most recently received reference signal blocks 353,354 may yield the result illustrated in part (e).

In the example of part (f), reference signal blocks 353,354 have signal quality metrics that do not meet the quality criterion (illustrated by striping), while reference signal blocks 351, 352 have signal quality metrics that meet the quality criterion, and the beam 360 is considered valid for the entire frequency range 358.

Determining that the spatial resource 360 is to be considered for spatial resource selection when the quality criterion is met for at least one 351, 352 of the plurality of received reference signal blocks 351, 352, 353, 354 (compare with step 285 of FIG. 4D to be described later) may yield the result illustrated in part (f).

With reference to the example of determining beam validity for a certain resource block (RB) in a scenario with SRS frequency hopping based on a determination of whether an SRS is labeled non-DTX or DTX, it may generally be beneficial to take the labels from different SRS hops into account, even when the hops are transmitted in different resource blocks. One motivation is that the SRS labels are based on time domain characteristics.

As indicated above, the determination of whether a beam is valid may apply one or more of a large variety of approaches. For example, the determination of whether a beam is valid may comprise determining that the beam is invalid if there is a DTX label for the current hop (compare, e.g., with parts (a), (d) and (e) of FIG. 4C), determining that the beam is valid if there is a non-DTX label for at least one hop (compare, e.g., with parts (b), (c) and (f) of FIG. 4C), determining that the beam is invalid if there is a DTX label for at least one hop (compare, e.g., with parts (a), (d) and (e) of FIG. 4C), determining that the beam is invalid if there are more hops with DTX labels than with non-DTX labels (compare, e.g., with part (a) of FIG. 4C), determining beam validity based on the aging of labels (implemented by, e.g., weighting, filtering, discarding, etc.), determining that the beam is valid if all other beams are invalid and at least one hop has a non-DTX label for the current beam (compare, e.g., with part (f) of FIG. 4C), determining beam validity based on the state of frequency adjacent hops (beneficial, e.g., when the frequency ranges for transmission and reception do not completely overlap), and any combinations thereof.

In some embodiments, the filtering in step 420 of FIG. 4A may be applied in the context of FIG. 4C by determining a collective quality state as implied for FIG. 4C (e.g., collective DTX for parts (a), (d), and (e), and collective non-DTX for parts (b), (c), and (f)), filtering that collective quality state (e.g., over time), and using the filtered quality state value to determine whether the beam is valid or invalid (compare with 320, 340, 360).

FIG. 4D illustrates an example method 480 according to some embodiments. The method may be used as an implementation of step 444 of FIG. 4B in some embodiments.

In step 481, indications are acquired—for each received reference signal block—regarding whether or not a signal quality metric of the received reference signal block meets a quality criterion (compare with the determination of step 443 of FIG. 4B). For example, the indications may relate to DTX/non-DTX labels (or DTX/non-DTX states).

In step 482, it is determined whether frequency hopping is enabled for reference signal transmissions. When frequency hopping is not enabled (N-path out of step 482), it is determined whether or not the spatial resource is to be considered for spatial resource selection (e.g., the beam is considered valid or invalid) based on received reference signal blocks according to any suitable approach, and the method proceeds directly to step 490, which is described later herein. When frequency hopping is enabled (Y-path out of step 482), the method proceeds to step 483.

In step 483, it is determined whether the frequency hopping is inter-slot (i.e., whether the plurality of reference signal blocks are not received in a same time slot). When the frequency hopping is inter-slot (Y-path out of step 483), the method proceeds to step 484. When the frequency hopping is not inter-slot (N-path out of step 483), i.e., when the frequency hopping is intra-slot and the plurality of reference signal blocks are received in a same time slot, the method proceeds to step 487.

In step 484 (inter-slot frequency hopping; the plurality of reference signal blocks are not received in a same time slot), it is determined whether or not the quality criterion is met for at least one of a group of most recently received reference signal blocks (e.g., reference signal blocks received in a current slot) of at least one spatial resource of the plurality of spatial resources.

For example, step 484 may comprise determining whether all received reference signal blocks in a current slot are labeled DTX for all of a plurality of beams under consideration. When all received reference signal blocks in a current slot are labeled DTX for all of beams (Y-path out of step 484), the method proceeds to step 485. When all received reference signal blocks in a current slot are not labeled DTX for all of beams (N-path out of step 484), the method proceeds to step 486.

In step 486, it may be determined that the spatial resource is to be considered for spatial resource selection when the quality criterion is met for the most recently received reference signal block (e.g., the beam may be considered valid when the latest received reference signal block is labeled non-DTX), and that the spatial resource is not to be considered for spatial resource selection otherwise.

Alternatively, it may be determined in step 486 that the spatial resource is to be considered for spatial resource selection when the quality criterion is met for at least one of a group of most recently received reference signal blocks (e.g., the beam may be considered valid when one or more of the reference signal blocks received in a current slot are labeled non-DTX), and that the spatial resource is not to be considered for spatial resource selection otherwise.

Alternatively, it may be determined in step 486 that the spatial resource is to be considered for spatial resource selection when the quality criterion is met for at least a first number of a group of most recently received reference signal blocks (e.g., the beam may be considered valid when the first number or more of the reference signal blocks received in a current slot are labeled non-DTX), and that the spatial resource is not to be considered for spatial resource selection otherwise.

In any case, the approach of step 486 may be considered as a first (default) approach for inter-slot hopping, wherein beam validity is determined based on DTX states of the current slot.

In step 485, it may be determined that the spatial resource is to be considered for spatial resource selection when the quality criterion is met for at least one of the received plurality of reference signal blocks (e.g., the beam may be considered valid when one or more of the reference signal blocks received in the current slot and in one or more previous slots are labeled non-DTX), and that the spatial resource is not to be considered for spatial resource selection otherwise.

The approach of step 485 may be considered as a second approach for inter-slot hopping, wherein beam validity is determined based on DTX states of more than the current slot.

In step 487 (intra-slot frequency hopping; the plurality of reference signal blocks are received in the same time slot), it is determined whether or not the quality criterion is met for at least one of the plurality of received reference signal blocks of at least one spatial resource of the plurality of spatial resources.

For example, step 487 may comprise determining whether at least one received reference signal block in a current slot is labeled non-DTX.

When at least one received reference signal block in a current slot is labeled non-DTX (Y-path out of step 487), the method proceeds to step 488, where it is determined that the spatial resource is to be considered for spatial resource selection (e.g., the beam is considered valid).

When all received reference signal blocks in a current slot are labeled DTX (N-path out of step 487), the method proceeds to step 489, where it is determined that the spatial resource is not to be considered for spatial resource selection (e.g., the beam is considered invalid).

After any of steps 485, 486, 488, and 489, as well as after taking the N-path out of step 482, the method proceeds to step 490.

In step 490, inputs to spatial resource selection (compare with step 445 of FIG. 4B) are prepared based on the determinations of whether or not the respective spatial resources are to be considered (e.g., validity of beams). For example, channel estimates of valid spatial resources may be used directly as inputs to spatial resource selection, while invalid spatial resources may be excluded from spatial resource selection (e.g., by setting corresponding channel estimates to zero).

In some embodiments, the determination of whether or not a spatial resource is to be considered for spatial resource selection (e.g., whether a beam is valid or invalid) may apply to (only) frequency intervals where the reference signal block was received which has a signal quality metric corresponding to the spatial resource determination (e.g., meeting the quality criterion in the case of valid beams and not meeting the quality criterion in the case of invalid beams).

Alternatively, the determination of whether or not a spatial resource is to be considered for spatial resource selection may apply to (only) frequency intervals where the reference signal blocks of a group of most recently received reference signal blocks was received (e.g., frequency intervals covered by reference signal blocks received in the current slot).

Alternatively, the determination of whether or not a spatial resource is to be considered for spatial resource selection may apply to (only) all frequency intervals where the reference signal blocks of the plurality of reference signal blocks was received.

Alternatively, the determination of whether or not a spatial resource is to be considered for spatial resource selection may apply to all frequency intervals where the spatial resource may be relevant.

In some embodiments, the filtering in step 420 of FIG. 4A may be applied in the context of FIG. 4C, for example, in the following way. Before determination as valid or invalid in any of the steps 485, 486, 488, and 489, an intermediate quality state is determined. For example, a determination as valid in the description of FIG. 4D may be replaced by a determination of intermediate quality state non-DTX, and a determination as invalid in the description of FIG. 4D may be replaced by a determination of intermediate quality state DTX. The intermediate quality states are filtered as described earlier herein, and the filter output values are used to for determination as valid or invalid before proceeding to step 490 of FIG. 4D.

Figure 5:
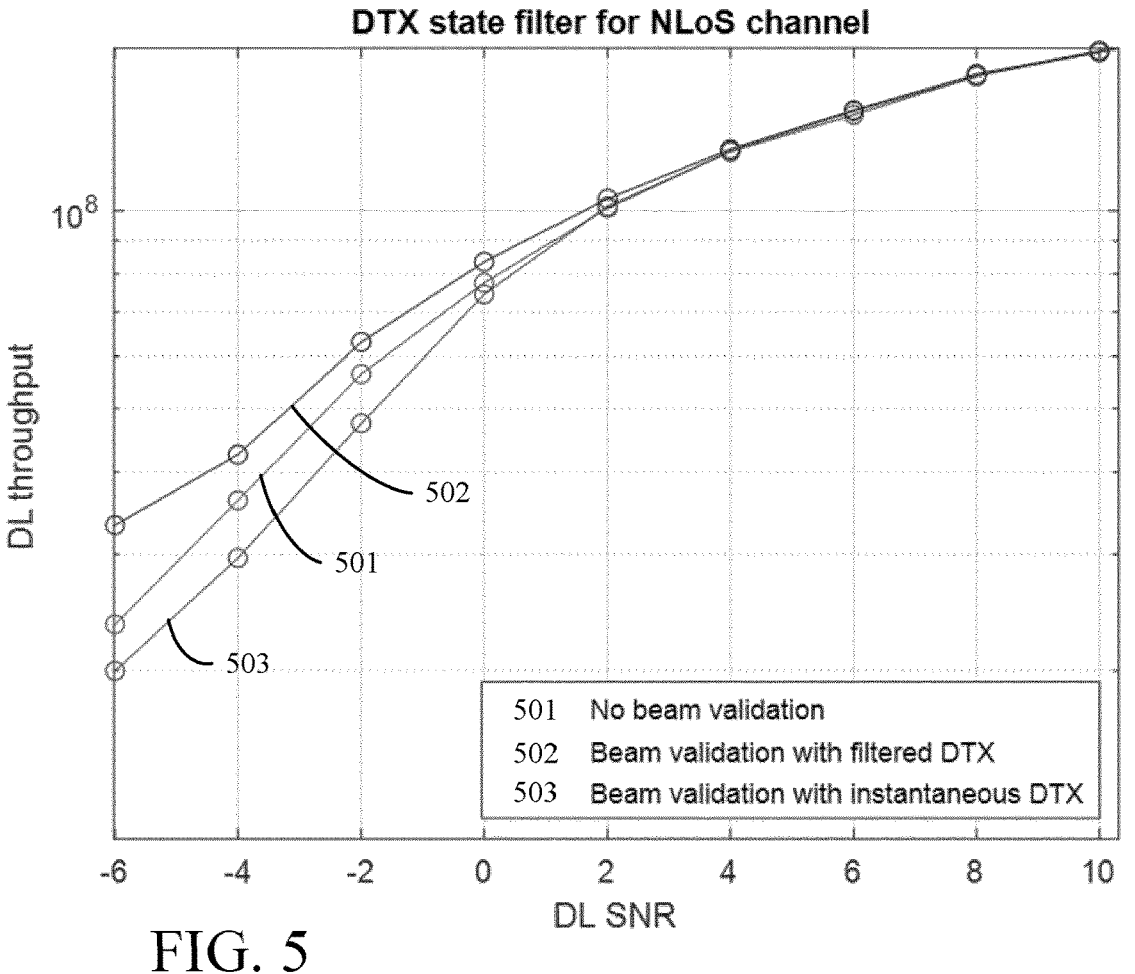
FIG. 5 illustrates (in the form of a plot) an example performance for some embodiments (e.g., embodiments of the presently disclosed techniques)

As noted above, spatial resource selection using the techniques described herein may provide performance advantages, particularly in non-line-of-sight (NLoS) scenarios. FIG. 5 illustrates an example of (downlink, DL) throughput performance 502 using (e.g., some of) the pres- ent techniques for beam validation with filtered DTX, in an NLoS scenario, as compared to beam validation with instantaneous DTX 503, and beam selection without validation 501. The DL throughput is shown as a function of DL SNR.

Figure 6:
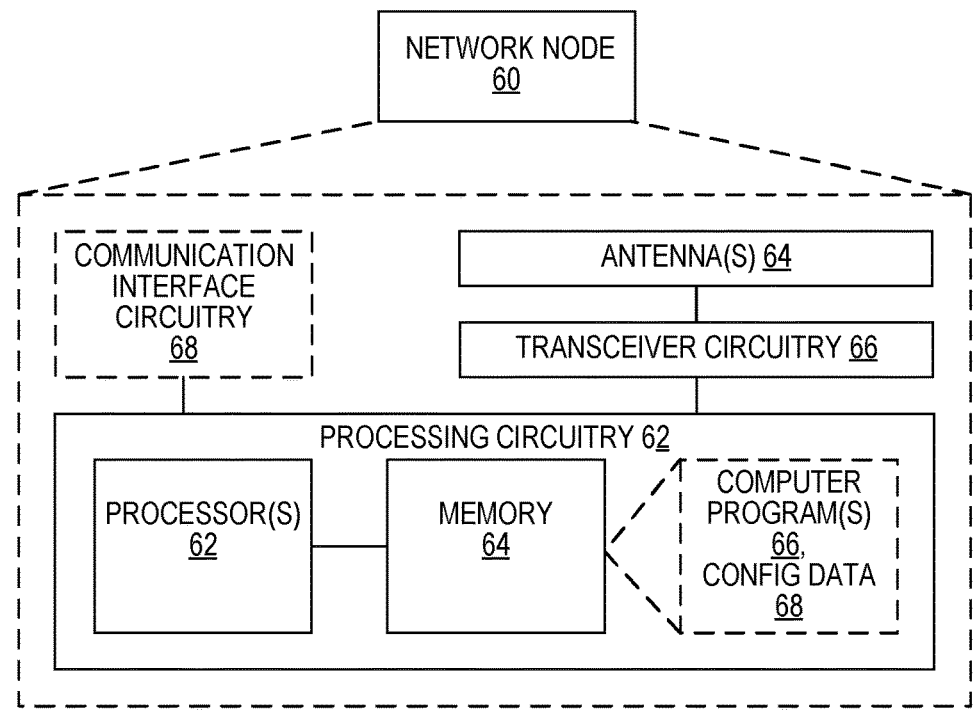
FIG. 6 illustrates (in the form of a schematic block diagram) an example network node according to some embodiments.
Figure 7:
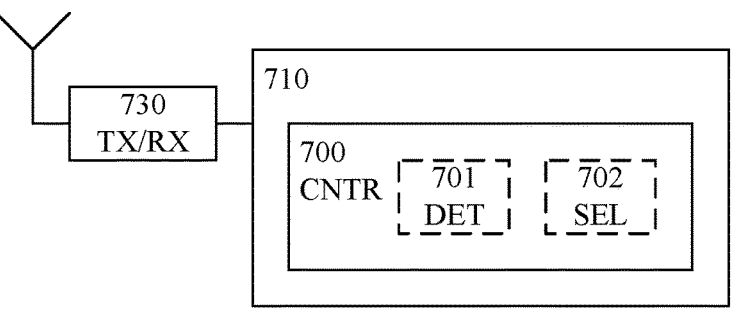
FIG. 7 is a schematic block diagram illustrating an example apparatus according to some embodiments.

FIGS. 6 and 7 each schematically illustrates an example apparatus for spatial resource selection from a plurality of spatial resources according to some embodiments.

FIG. 6 shows an example network node 60 that may correspond to any of the access nodes described herein, whether acting as a target node or source node of a handover. Network node 60 may be configured to carry out one or more of these disclosed techniques. Network node 60 may be an evolved Node B (eNodeB), Node B or gNB, for example. Network node may represent a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS).

In the discussion herein, network node 60 is described as being configured to operate as a cellular network access node in an LTE network or NR network, but network node 60 may also correspond to similar access nodes in other types of network.

Those skilled in the art will readily appreciate how each type of node may be adapted to carry out one or more of the methods and signaling processes described herein, e.g., through the modification of and/or addition of appropriate program instructions for execution by processing circuits 62.

Network node 60 facilitates communication between wireless terminals (e.g., UEs), other network access nodes and/or the core network. Network node 60 may include communication interface circuitry 68 that includes circuitry for communicating with other nodes in the core network, radio nodes, and/or other types of nodes in the network for the purposes of providing data and/or cellular communication services. Network node 60 communicates with wireless devices using antennas 64 and transceiver circuitry 66. Transceiver circuitry 66 may include transmitter circuits, receiver circuits, and associated control circuits that are collectively configured to transmit and receive signals according to a radio access technology, for the purposes of providing cellular communication services.

Network node 60 also includes one or more processing circuits 62 that are operatively associated with the transceiver circuitry 66 and, in some cases, the communication interface circuitry 68. Processing circuitry 62 comprises one or more digital processors 62, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 62 may comprise fixed circuitry, or programmable circuitry that is specially configured via the execution of program instructions implementing the functionality taught herein, or some mix of fixed and programmed circuitry. Processor 62 may be multi-core, i.e., having two or more processor cores utilized for enhanced performance, reduced power consumption, and more efficient simultaneous processing of multiple tasks.

Processing circuitry 62 also includes a memory 64. Memory 64, in some embodiments, stores one or more computer programs 66 and, optionally, configuration data 68. Memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 64 comprises any one or more of SRAM, DRAM, EEPROM, and FLASH memory, which may be in processing circuitry 62 and/or separate from processing circuitry 62. Memory 64 may also store any configuration data 68 used by the network access node 60. Processing circuitry 62 may be configured, e.g., through the use of appropriate program code stored in memory 64, to carry out one or more of the methods and/or signaling processes detailed hereinafter.

Processing circuitry 62 of the network node 60 is configured, according to some embodiments, to perform the techniques described herein for a network node or for a transmitting node, such as a node configured to carry out a method according to the method of FIG. 4A or variants thereof.

FIG. 7 illustrates an apparatus 710 that may be comprisable, or comprised, in a network node (e.g., a radio access node such as a base station, or a network control node such as a centralized server node) according to some embodiments. Alternatively, or additionally, the apparatus 710 may be configured to cause execution of (e.g., execute) one or more of the method steps of FIG. 4A, or (method steps) otherwise described herein.

The apparatus comprises a controller (CNTR; e.g., controlling circuitry or a control module) 700. The controller may be configured to cause execution of (e.g., execute or carry out) one or more of the method steps of FIG. 4A, or variants thereof.

To this end, the controller may comprise, or be otherwise associated with (e.g., connectable, or connected, to) a receiver (e.g., receiving circuitry or a reception module) and/or a transmitter (e.g., transmitting circuitry or a transmission module). In the example of FIG. 7, each of the receiver and the transmitter is illustrated as part of a transceiver (TX/RX; e.g., radio circuitry configured to communicate with one or more wireless devices) 730. The receiver may be configured to receive a plurality of reference signals as described above (compare with step 442 of FIG. 4B). The transmitter may be configured to transmit using a selected spatial resource (compare with step 446 of FIG. 4B) and/or to transmit a configuration for reception nodes (compare with step 441 of FIG. 4B).

The controller is configured to cause, for each of at least one spatial resource of the plurality of spatial resources, determination, for each of a plurality of time instances, of a quality state for the spatial resource, based on reference signals received on the spatial resource (compare with step 410 of FIG. 4A).

The controller is also configured to cause filtering of the quality states, to determine a filtered quality state value for the spatial resource (compare with step 420 of FIG. 4A).

The controller is also configured to cause determination of whether the spatial resource is to be considered for spatial resource selection based on the filtered quality state value (compare with step 430 of FIG. 4A).

For example, the controller may be configured to determine, for each of a plurality of time instances, a quality state for a spatial resource, based on received reference signals and to filter the quality states, to determine a filtered quality state value for the spatial resource. Alternatively, or additionally, the controller may be configured to determine whether the spatial resource is to be considered for spatial resource selection based on the filtered quality state value.

To this end, the controller may comprise, or be otherwise associated with (e.g., connectable, or connected, to) a determiner (DET; e.g., determining circuitry or a determination module) 701. The determiner may be configured to determine, for each of a plurality of time instances, a quality state for a spatial resource, based on received reference signals, to filter the quality states, to determine a filtered quality state value for the spatial resource, and to determine whether the spatial resource is to be considered for spatial resource selection based on the filtered quality state value.

In some embodiments, the controller is configured to cause determination of whether signal quality metrics of the received reference signal blocks meet the quality criterion, and—based thereon—whether the spatial resources are to be considered for spatial resource selection (compare with steps 443, 444 of FIG. 4B).

To this end, the determiner may be configured to determine whether signal quality metrics of the received reference signal blocks meet the quality criterion, and—based thereon—whether the spatial resources are to be considered for spatial resource selection.

In some embodiments, the controller may comprise processing circuitry operatively coupled to the radio circuitry and configured to control the radio circuitry and to determine, for each of a plurality of time instances, a quality state for the spatial resource, based on reference signals received on the spatial resource, filter the quality states, to determine a filtered quality state value for the spatial resource, and determine whether the spatial resource is to be considered for spatial resource selection based on the filtered quality state value.

The controller may also be configured to cause selection of a spatial resource based on spatial resources which have been determined to be considered for spatial resource selection (compare with step 445 of FIG. 4B).

To this end, the controller may comprise, or be otherwise associated with (e.g., connectable, or connected, to) a selector (SEL; e.g., selecting circuitry or a selection module) 702. The selector may be configured to select a spatial resource based on spatial resources which have been determined to be considered for spatial resource selection.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively, or additionally, the embodiments may be performed by specialized circuitry, such as application specific integrated circuits (ASIC). The general purpose circuitry and/or the specialized circuitry may, for example, be associated with or comprised in an apparatus such as a network node (e.g., a base station).

Embodiments may appear within an electronic apparatus (such as a network node) comprising arrangements, circuitry, and/or logic according to any of the embodiments described herein. Alternatively, or additionally, an electronic apparatus (such as a network node) may be configured to perform methods according to any of the embodiments described herein.

Figure 8:
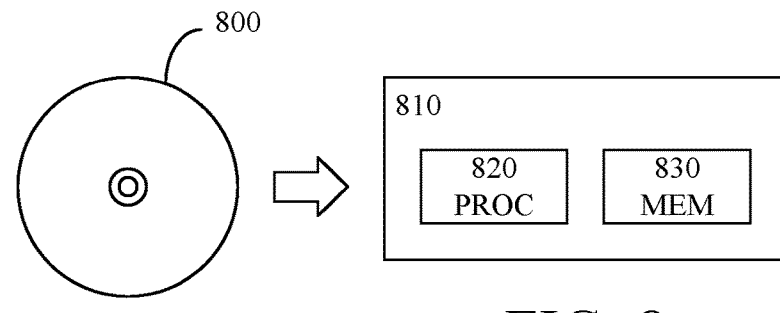
FIG. 8 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a network node 810 or 60. When loaded into the data processor, the computer program may be stored in a memory (MEM) 830 associated with or comprised in the processor (e.g., data processing unit). According to some embodiments, the computer program may, when loaded into and run by the data processor (e.g., data processing unit), cause execution of method steps according to, for example, any of the methods described herein.

Figure 9:
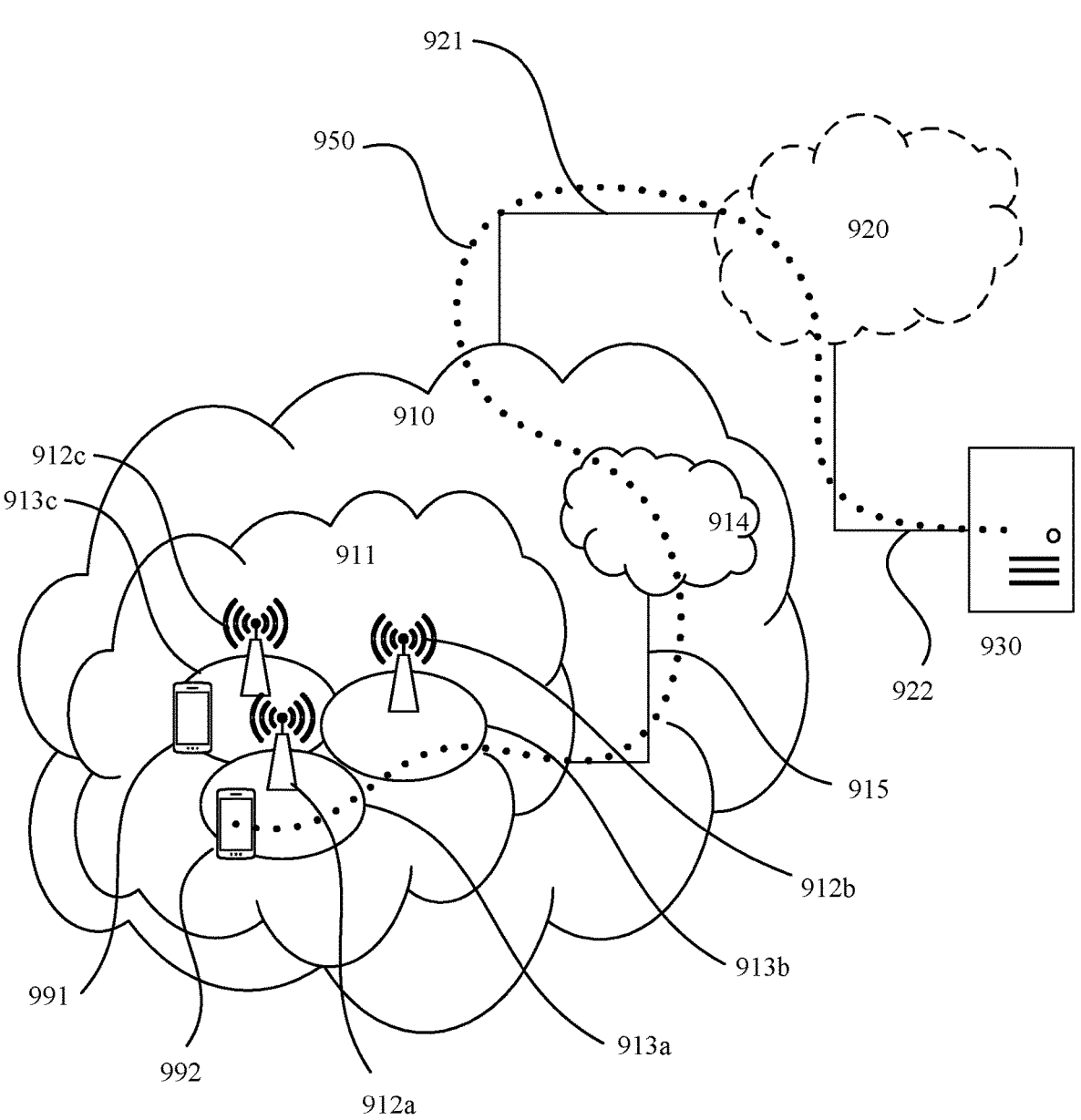
FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station

912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application

1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
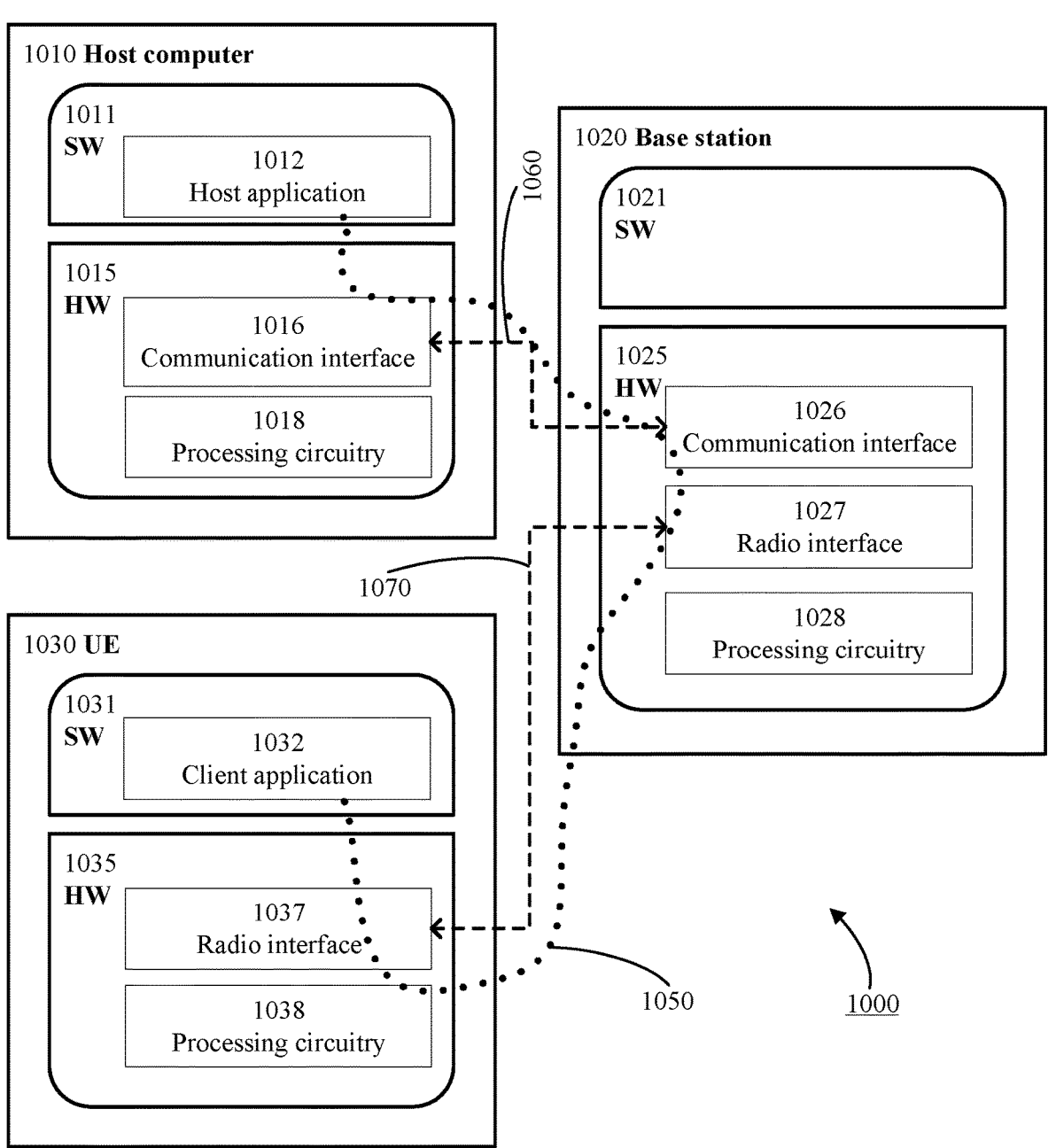
FIG. 10 illustrates a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the spatial resource selection to be used by a transmitter, and thereby provide benefits such as increased throughput.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
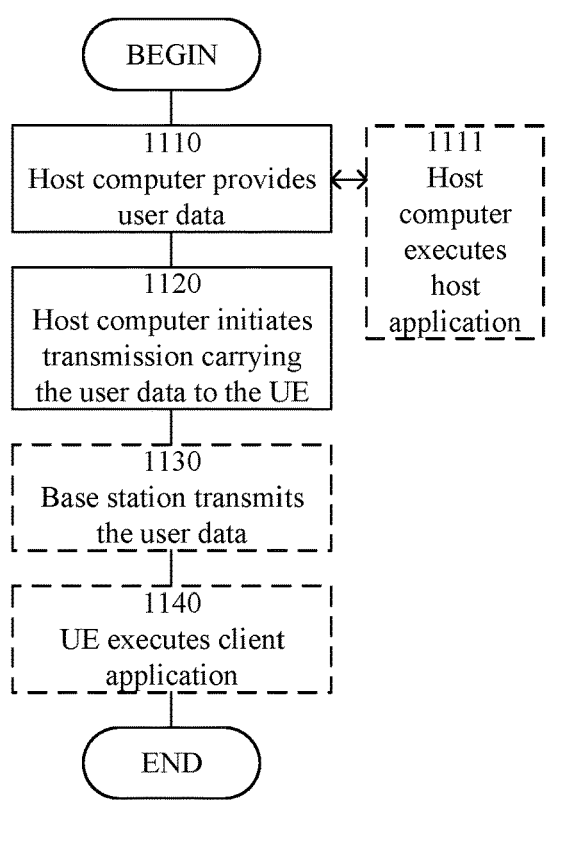
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
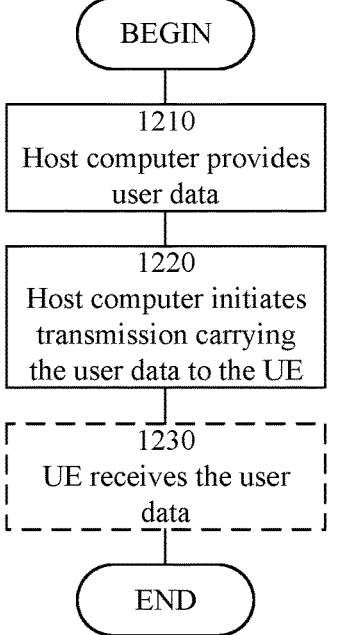
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
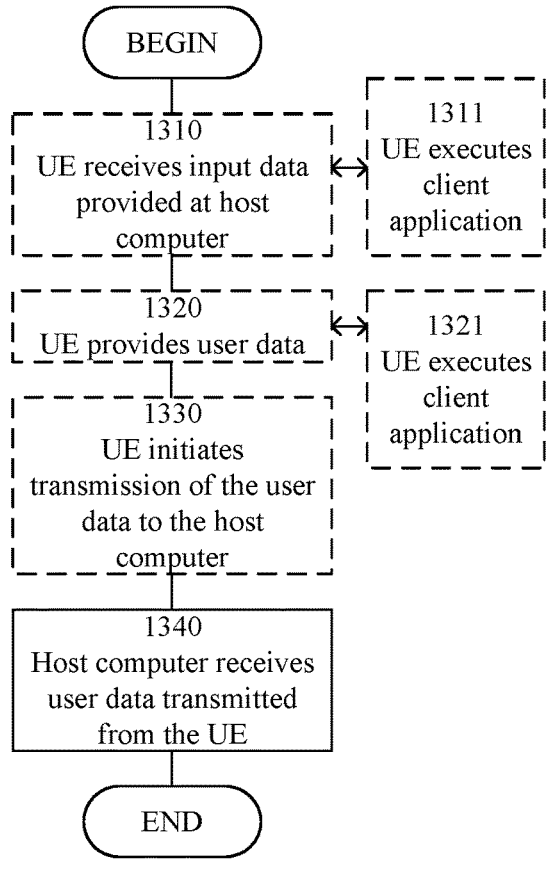
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally, or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
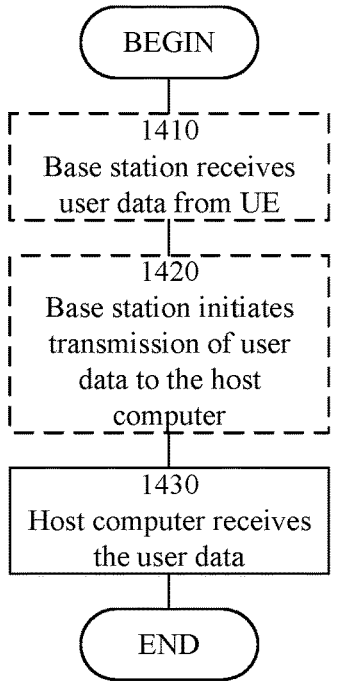
FIG. 14 is a flowchart illustrating example method steps implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Some embodiment described herein may be applicable for one or more of the base stations 912*a-c*, 1020, and/or in combination with one or more of the steps 1130, 1420 (compare with step 446 of FIG. 4B), for example.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group B Embodiments

B1. A method for spatial resource selection from a plurality of spatial resources, the method comprising, for each of at least one spatial resource of the plurality of spatial resources:

determining, for each of a plurality of time instances, a quality state for the spatial resource, based on reference signals received on the spatial resource;

filtering the quality states, to determine a filtered quality state value for the spatial resource; and determining whether the spatial resource is to be considered for spatial resource selection based on the filtered quality state value.

B2. The method of example embodiment B1, wherein each quality state is determined by comparing a reference signal quality for the respective time instance to a reference signal quality threshold, to obtain either a first quality state or a second quality state.

B3. The method of example embodiment B2, wherein the first and second quality states are a non-DTX state and a DTX state, respectively, the non-DTX states corresponding to reference signal qualities higher than the reference signal quality threshold.

B4. The method of example embodiments B2 or B3, wherein the first and second quality states correspond to first and second numerical values, respectively, and wherein filtering the quality states comprises calculating a usability metric as a function of the numerical value for a most recent quality state and a previous value for the filtered quality state value, to obtain the filtered quality state value.

B5. The method of example embodiment B4, wherein the function is asymmetric with respect to the function's response to the first and second numerical values.

B6. The method of example embodiment B5, wherein the function takes the form of:

$$DTX_b^{filtered} = \begin{cases} (1-\alpha)*DTX_b^{filtered,prev} + \alpha*DTX_b, & DTX_b = 1 \\ DTX_b^{filtered,prev}/K, & DTX_b = 0 \end{cases},$$

where $$DTX_b^{filtered}$$

is the filtered quality state value, $DTX_b$ is the most recent quality state, 0 and 1 are the first and second numerical values, $$DTX_b^{filtered,prev}$$

is the previous value for the filtered quality state value, a is a filter parameter having a value between 0 and 1, K is a filter parameter having a value greater than 1, and b is an index to the spatial resource.

B7. The method of example embodiment B4, wherein the function is symmetric with respect to the function's response to the first and second numerical values.

B8. The method of example embodiment B7, wherein the function takes the form of:

$$DTX_b^{filtered} = (1-\alpha)*DTX_b^{filtered,prev} + \alpha*DTX_b, DTX_b = -1, 1,$$

where $$DTX_b^{filtered}$$

is the filtered quality state value, $DTX_b$ is the most recent quality state, −1 and 1 are the first and second numerical values, $$DTX_b^{filtered,prev}$$

is the previous value for the filtered quality state value, a is a filter parameter having a value between 0 and 1, and b is an index to the spatial resource.

B9. The method of any of example embodiments B1-B8, wherein determining whether the spatial resource is to be considered for spatial resource selection comprises comparing the filtered quality state value to a quality state threshold.

B10. The method of any of example embodiments B1-B8, wherein determining whether the spatial resource is to be considered for spatial resource selection comprises, for a first spatial resource, evaluating the filtered quality state value for the first spatial resource jointly with a filtered quality state value for a second spatial resource.

B11. The method of example embodiment B10, wherein the first spatial resource is a first beam having a beam direction and a first antenna polarization and the second spatial resource is a second beam having the same beam direction and a second antenna polarization, the second antenna polarization differing from the first antenna polarization.

B12. The method of any of example embodiments B1-B8, wherein the method comprises, for a first spatial resource being a beam of a first node, filtering quality states corresponding to each of a plurality of antenna ports for a second node, to obtain filtered quality state values for each of the plurality of antenna ports, and determining whether the first spatial resource is to be considered for spatial resource selection based on the filtered quality state values for the plurality of antenna ports.

B13. The method of example embodiment B12, wherein determining whether the first spatial resource is to be considered for spatial resource selection comprises determining that the first spatial resource is to be considered for spatial resource selection if at least one of the filtered quality state values for the plurality of antenna ports fulfills a predetermined threshold requirement.

B14. The method of any of example embodiments B1-B8, wherein the method comprises, for a first spatial resource being an antenna port of a first node, filtering quality states corresponding to each of a plurality of beams for a second node, to obtain filtered quality state values for each of the beams, and determining whether the first spatial resource is to be considered for spatial resource selection based on the filtered quality state values for the plurality of beams.

B15. An apparatus adapted to carry out a method according to any one of example embodiments B1-B14.

B16. A base station apparatus, comprising radio circuitry configured to communicate with one or more wireless devices and processing circuitry operatively coupled to the radio circuitry and configured to control the radio circuitry and to:
determine, for each of a plurality of time instances, a quality state for the spatial resource, based on reference signals received on the spatial resource;
filter the quality states, to determine a filtered quality state value for the spatial resource; and
determine whether the spatial resource is to be considered for spatial resource selection based on the filtered quality state value.

B17. The base station apparatus of example embodiment B16, wherein the processing circuitry is configured to carry out a method according to any one of example embodiments B2-B14.

Group C Embodiments

C1. A base station for spatial resource selection, the base station comprising:
processing circuitry configured to perform a method according to any one of example embodiments B1-B14;
power supply circuitry configured to supply power to the base station.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any one of example embodiments B1-B14.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any one of example embodiments B1-B14.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A base station configured to communicate with a user equipment (UE), the base station comprising a radio interface and processing circuitry configured to perform the method of any of embodiments D5 through D7.

D9. A communication system including a host computer comprising a communication interface configured to receive user data originating from a transmission from a user equipment (UE) to a base station, wherein the base station comprises a radio interface and processing circuitry, the base station's processing circuitry configured to perform any one of example embodiments B1-B14.

D10. The communication system of embodiment D9 further including the base station.

D11. The communication system of any of embodiments D9 through D10, further including the UE, wherein the UE is configured to communicate with the base station.

D12. The communication system of any of embodiments D9 through D10, wherein:

the processing circuitry of the host computer is configured to execute a host application;

the UE is configured to execute a client application associated with the host application, thereby providing the user data to be received by the host computer.

D13. A method implemented in a communication system including a host computer, a base station and a user equipment (UE), the method comprising:

at the host computer, receiving, from the base station, user data originating from a transmission which the base station has received from the UE, wherein the base station performs any one of example embodiments B1-B14.

D14. The method of embodiment D13, further comprising at the base station, receiving the user data from the UE.

D15. The method of any of embodiments D13 through D14, further comprising at the base station, initiating a transmission of the received user data to the host computer.

The invention claimed is:

1. A method for spatial resource selection from a plurality of spatial resources, the method comprising, for each of at least one spatial resource of the plurality of spatial resources:

determining, for each of a plurality of time instances, a quality state for the spatial resource, based on reference signals received on the spatial resource;

filtering the quality states, to determine a filtered quality state value for the spatial resource; and determining whether the spatial resource is to be considered for spatial resource selection based on the filtered quality state value.

2. The method of claim 1, wherein the quality state belongs to a collection of possible quality states comprising a first quality state and a second quality state, wherein the first quality state indicates better quality than the second quality state.

3. The method of claim 2, wherein the first and second quality states are a non-discontinuous transmission (non-DTX) state and a discontinuous transmission (DTX) state, respectively.

4. The method of claim 2, wherein each quality state is determined by comparing a reference signal quality for the respective time instance to a reference signal quality threshold, to obtain either the first quality state or the second quality state, and wherein filtering the quality states comprises using a first filter function when a most recent quality state is the first quality state and using a second filter function when the most recent quality state is the second quality state, the first and second filter functions being different.

5. The method of claim 4, wherein an influence of the most recent quality state on a filter output is higher for the first filter function than for the second filter function.

6. The method of claim 4, wherein the second filter function is implemented using an infinite impulse response (IIR)-filter, or a finite impulse response (FIR)-filter.

7. The method of claim 4, wherein the first filter function output equals the most recent quality state.

8. The method of claim 2, wherein the first and second quality states correspond to first and second numerical values, respectively, and wherein filtering the quality states comprises calculating a usability metric as a function of the numerical value for a most recent quality state and a previous value for the filtered quality state value, to obtain the filtered quality state value.

9. The method of claim 8, wherein the function is asymmetric with respect to the function's response to the first and second numerical values.

10. The method of claim 9, wherein the first numerical value is zero and wherein an effect of the function comprises, when the most recent quality state corresponds to the first numerical value: dividing the previous value for the filtered quality state value by a first filter parameter having a value greater than one.

11. The method of claim 9, wherein an effect of the function comprises, when the most recent quality state corresponds to the second numerical value: adding the previous value for the filtered quality state value, multiplied by a second filter parameter having a value between zero and one, to the value for the most recent quality state value, multiplied by a third filter parameter having a value between zero and one.

12. The method of claim 9, wherein the function takes the form of:

$$DTX_b^{filtered} = \begin{cases} (1 - \alpha) * DTX_b^{filtered,prev} + \alpha * DTX_b, & DTX_b = 1 \\ DTX_b^{filtered,prev} \big/ K, & DTX_b = 0 \end{cases},$$

where $$DTX_b^{filtered}$$

filtered is the filtered quality state value, $DTX_b$ is the most recent quality state, 0 and 1 are the first and second numerical values, $$DTX_b^{filtered,prev}$$

is the previous value for the filtered quality state value, a is a filter parameter having a value between 0 and 1, K is a filter parameter having a value greater than 1, and b is an index to the spatial resource.

13. The method of claim 8, wherein the function is symmetric with respect to the function's response to the first and second numerical values, and wherein the function takes the form of:

$$DTX_b^{filtered} = (1 - \alpha) * DTX_b^{filtered,prev} + \alpha * DTX_b, DTX_b = -1, 1,$$

where $$DTX_b^{filtered}$$

is the filtered quality state value, $DTX_b$ is the most recent quality state, −1 and 1 are the first and second numerical values, $$DTX_b^{filtered,prev}$$

is the previous value for the filtered quality state value, a is a filter parameter having a value between 0 and 1, and b is an index to the spatial resource.

14. The method of claim 1, wherein determining whether the spatial resource is to be considered for spatial resource selection comprises, for a first spatial resource, evaluating the filtered quality state value for the first spatial resource jointly with a filtered quality state value for a second spatial resource.

15. The method of claim 14, wherein the first spatial resource is a first beam having a beam direction and a first antenna polarization and the second spatial resource is a second beam having the same beam direction as the first beam and a second antenna polarization, the second antenna polarization differing from the first antenna polarization.

16. The method of claim 1, wherein the method comprises, for a first spatial resource being a beam of a first node, filtering quality states corresponding to each of a plurality of antenna ports for a second node, to obtain filtered quality state values for each of the plurality of antenna ports, and determining whether the first spatial resource is to be considered for spatial resource selection based on the filtered quality state values for the plurality of antenna ports.

17. The method of claim 16, wherein determining whether the first spatial resource is to be considered for spatial resource selection comprises determining that the first spatial resource is to be considered for spatial resource selection if at least one of the filtered quality state values for the plurality of antenna ports fulfills a predetermined threshold requirement.

18. The method of claim 1, wherein the method comprises, for a first spatial resource being an antenna port of a first node, filtering quality states corresponding to each of a plurality of beams for a second node, to obtain filtered quality state values for each of the beams, and determining whether the first spatial resource is to be considered for spatial resource selection based on the filtered quality state values for the plurality of beams.

19. A base station apparatus, comprising radio circuitry configured to communicate with one or more wireless devices and processing circuitry operatively coupled to the radio circuitry and configured to control the radio circuitry and to:

determine, for each of a plurality of time instances, a quality state for the spatial resource, based on reference signals received on the spatial resource;

filter the quality states, to determine a filtered quality state value for the spatial resource; and determine whether the spatial resource is to be considered for spatial resource selection based on the filtered quality state value.

20. An apparatus for spatial resource selection from a plurality of spatial resources, the apparatus comprising controlling circuitry configured to cause, for each of at least one spatial resource of the plurality of spatial resources:

determination, for each of a plurality of time instances, of a quality state for the spatial resource, based on reference signals received on the spatial resource;

filtering of the quality states, to determine a filtered quality state value for the spatial resource; and determination of whether the spatial resource is to be considered for spatial resource selection based on the filtered quality state value.

* * * * *